(12) United States Patent
Allen et al.

(10) Patent No.: US 10,720,783 B2
(45) Date of Patent: Jul. 21, 2020

(54) WIRELESS CHARGING STAND

(71) Applicants: Intel Corporation, Santa Clara, CA (US); Stephen John Allen, Emerald Hills, CA (US); Gregory A. Peek, Northplains, OR (US); Yoshifumi Nishi, Aloha, OR (US); Rolf Laido, Portland, OR (US); Shaun Gerrit Immeker, Wilton, CA (US); Kerry A. Stevens, Beaverton, OR (US); Andrew Larson, Hillsboro, OR (US); Ralph V. Miele, Hillsboro, OR (US); Kimi Jensen, Beaverton, OR (US); Duck Young Kong, Beaverton, OR (US); Dan H. Gerbus, Aloha, OR (US)

(72) Inventors: Stephen John Allen, Emerald Hills, CA (US); Gregory A. Peek, Northplains, OR (US); Yoshifumi Nishi, Aloha, OR (US); Rolf Laido, Portland, OR (US); Shaun Gerrit Immeker, Wilton, CA (US); Kerry A. Stevens, Beaverton, OR (US); Andrew Larson, Hillsboro, OR (US); Ralph V. Miele, Hillsboro, OR (US); Kimi Jensen, Beaverton, OR (US); Duck Young Kong, Beaverton, OR (US); Dan H. Gerbus, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 15/756,053

(22) PCT Filed: Sep. 25, 2015

(86) PCT No.: PCT/US2015/052358
§ 371 (c)(1),
(2) Date: Feb. 27, 2018

(87) PCT Pub. No.: WO2017/052623
PCT Pub. Date: Mar. 30, 2017

(65) Prior Publication Data
US 2018/0358826 A1    Dec. 13, 2018

(51) Int. Cl.
*H02J 7/02* (2016.01)
*H02J 7/00* (2006.01)
(Continued)

(52) U.S. Cl.
CPC ............ *H02J 7/0044* (2013.01); *H02J 7/025* (2013.01); *H02J 50/10* (2016.02); *H02J 50/12* (2016.02); *H02J 50/40* (2016.02)

(58) Field of Classification Search
CPC ..................................................... H02J 7/025
(Continued)

(56) References Cited

U.S. PATENT DOCUMENTS 9,531,206 B2 *  12/2016  Tsai .................... H02J 7/025
10,037,057 B2 *  7/2018  Schafer ................ G06F 1/1681
(Continued)

FOREIGN PATENT DOCUMENTS

EP         2472697 A1    7/2012

OTHER PUBLICATIONS

PCT Jun. 20, 2016 International Search Report and Written Opinion from PCT/US2015/052358; 11 pages.

*Primary Examiner* — Edward Tso
*Assistant Examiner* — Ahmed H Omar
(74) *Attorney, Agent, or Firm* — Patent Capital Group

(57) ABSTRACT

Particular embodiments described herein provide for an electronic device, that includes a first housing and a wireless charging stand. The first housing can include a display. The
(Continued)

wireless charging stand can include a power receiving unit and is configured to wireless charge the electronic device and support the first housing at different viewing angles of the display.

20 Claims, 28 Drawing Sheets

(51) Int. Cl.
*H02J 50/10* (2016.01)
*H02J 50/12* (2016.01)
*H02J 50/40* (2016.01)

(58) Field of Classification Search
USPC .................................................. 320/108, 114
See application file for complete search history.

(56) References Cited

U.S. PATENT DOCUMENTS

| | | |
|---|---|---|
| 2006/0238164 A1 | 10/2006 | Rosal et al. |
| 2009/0096413 A1* | 4/2009 | Partovi .................... H01F 5/003 |
| | | 320/108 |
| 2012/0299966 A1 | 11/2012 | Kim et al. |
| 2013/0063084 A1* | 3/2013 | Tilvis .................... H02J 7/0044 |
| | | 320/108 |
| 2013/0063873 A1 | 3/2013 | Wodrich et al. |
| 2013/0113421 A1 | 5/2013 | Han et al. |

* cited by examiner

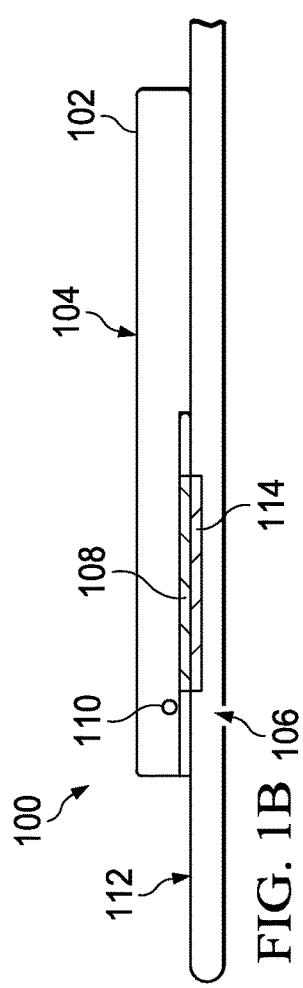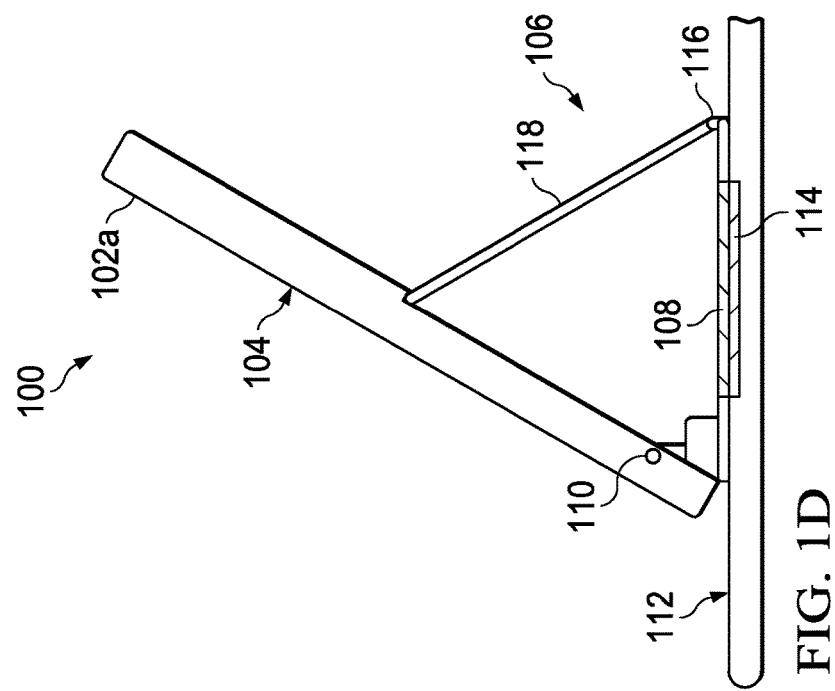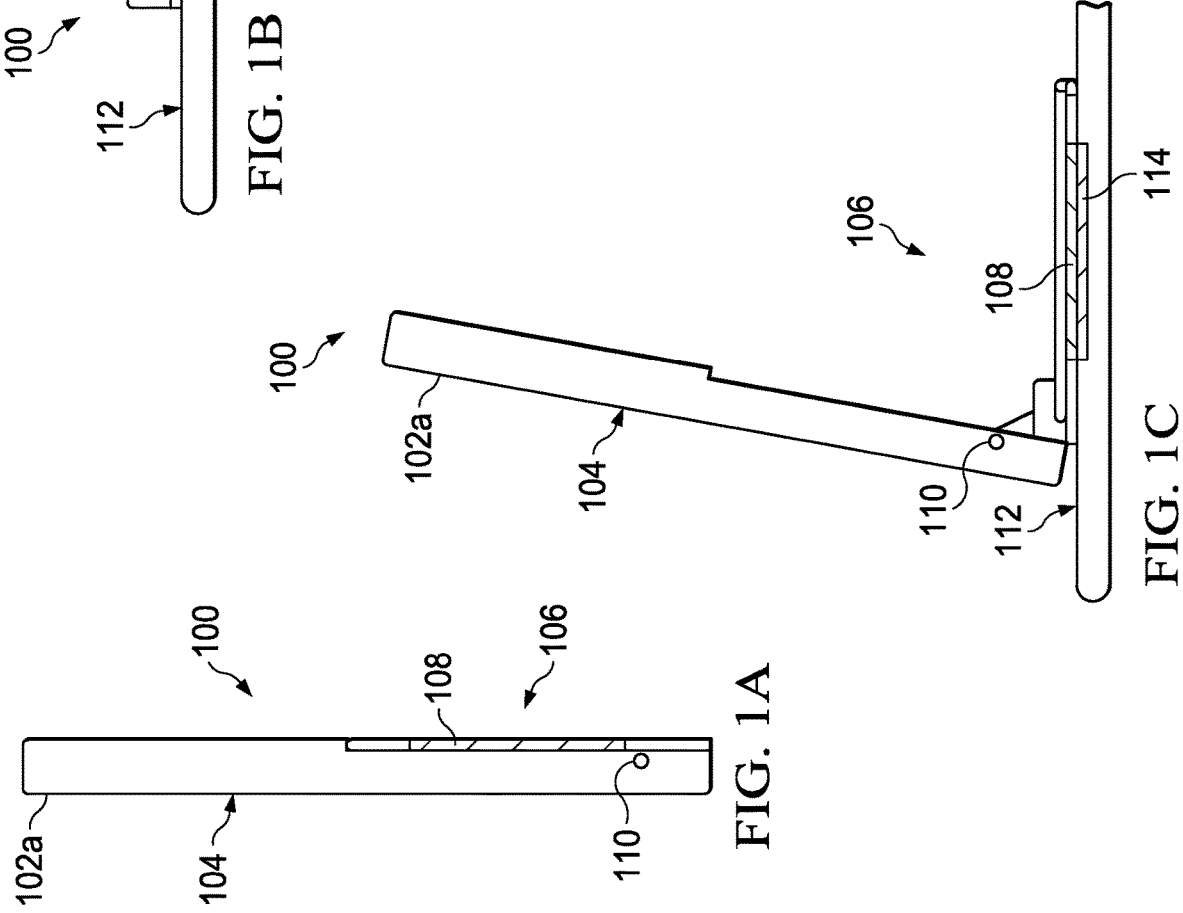

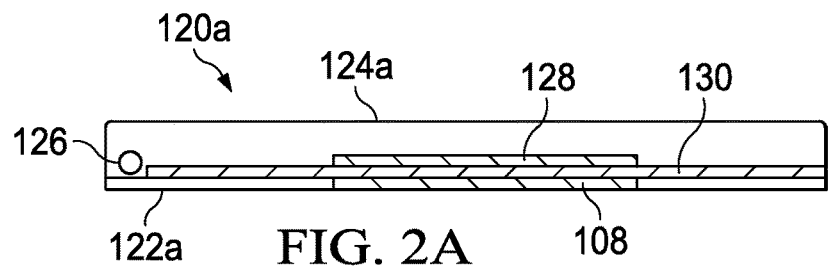
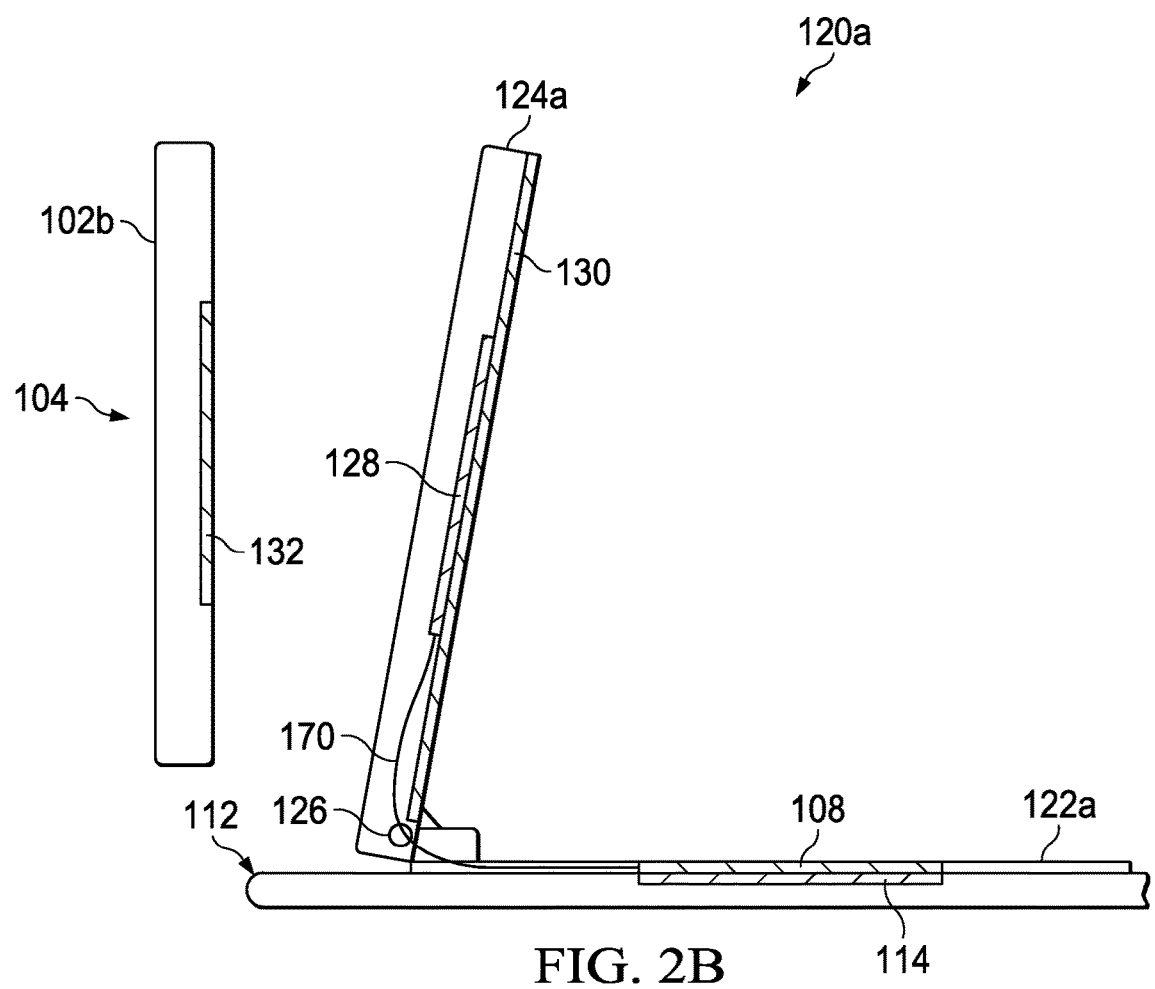

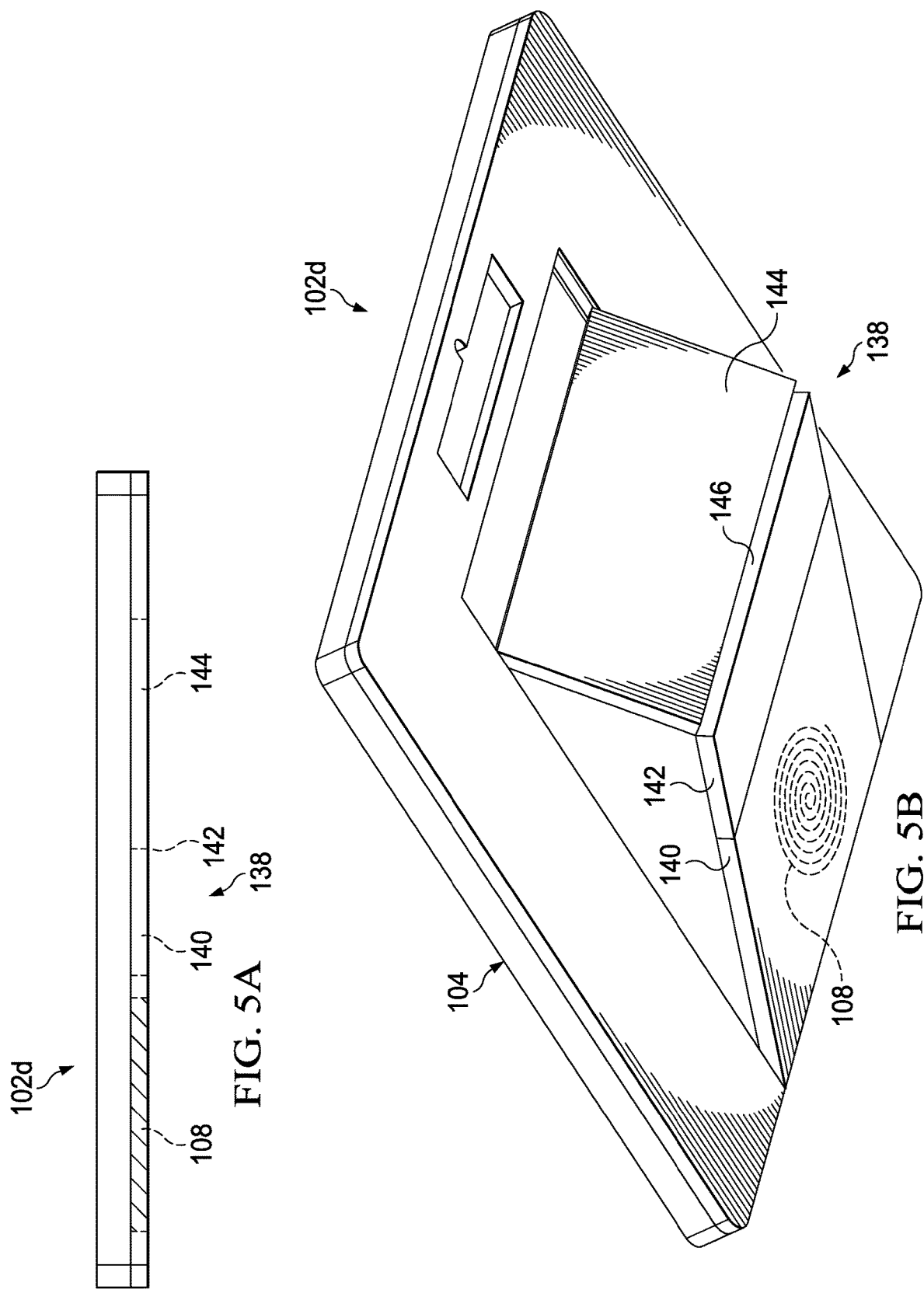

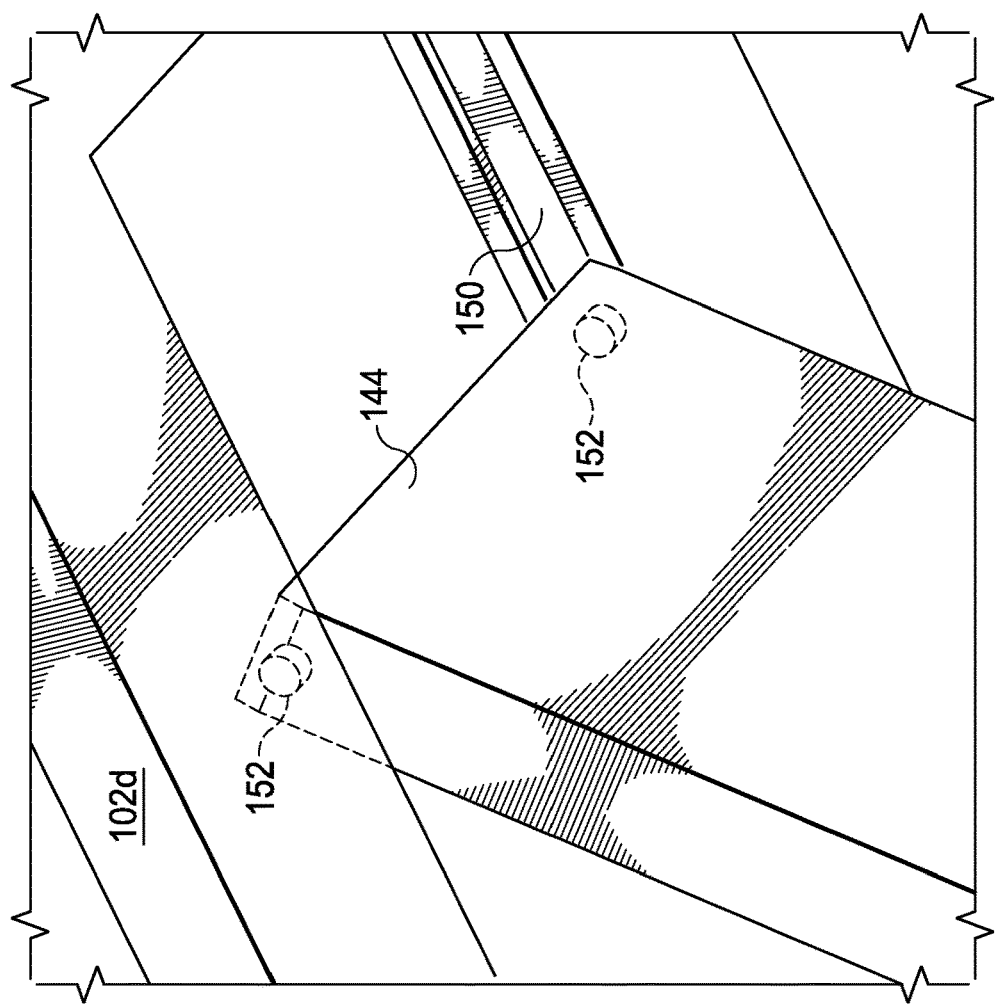
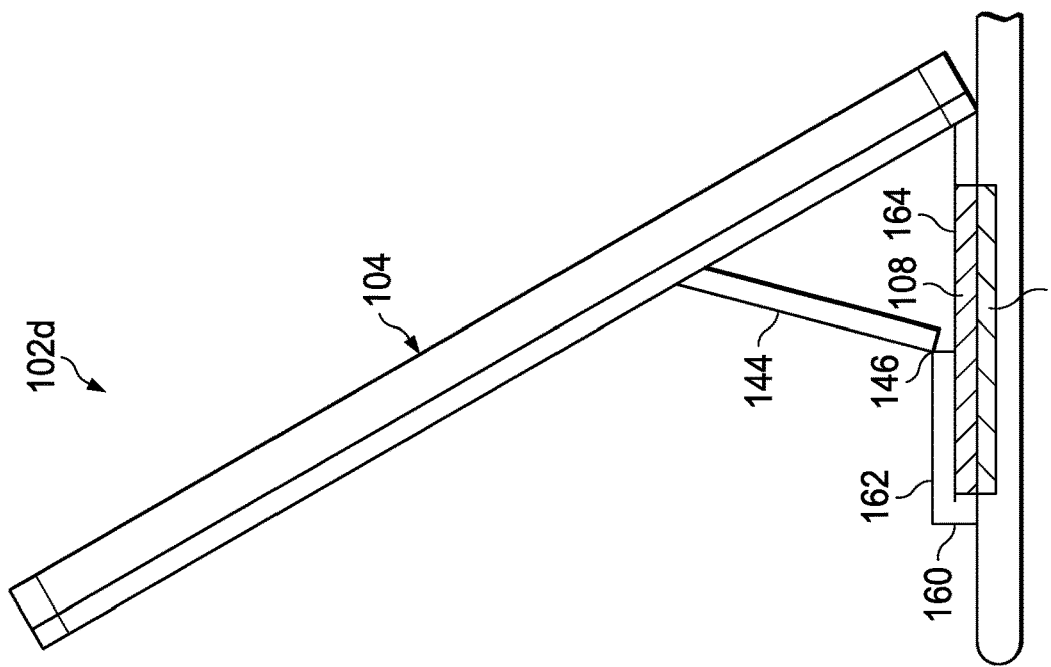
FIG. 5F
FIG. 5E

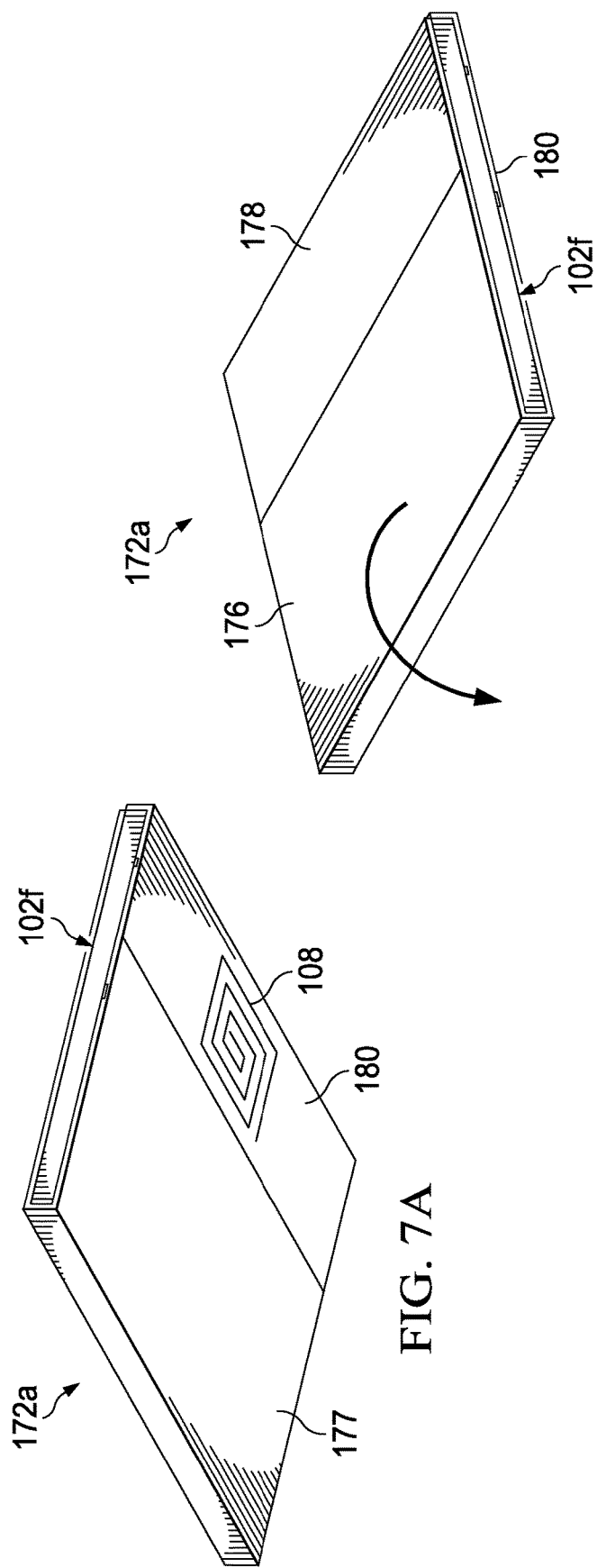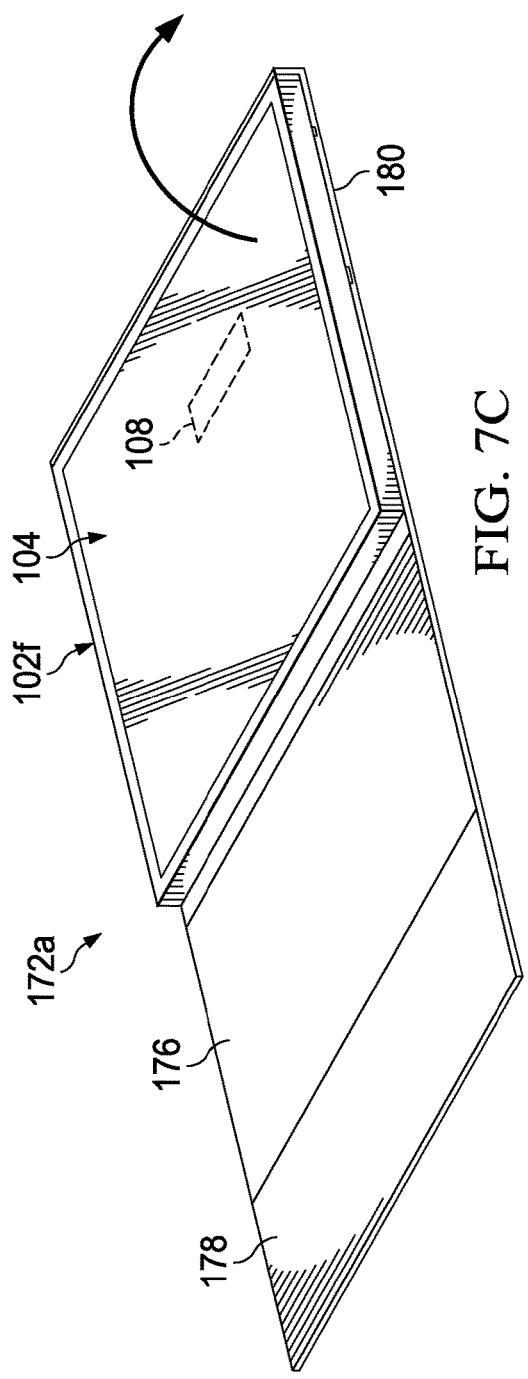
FIG. 7A
FIG. 7B
FIG. 7C

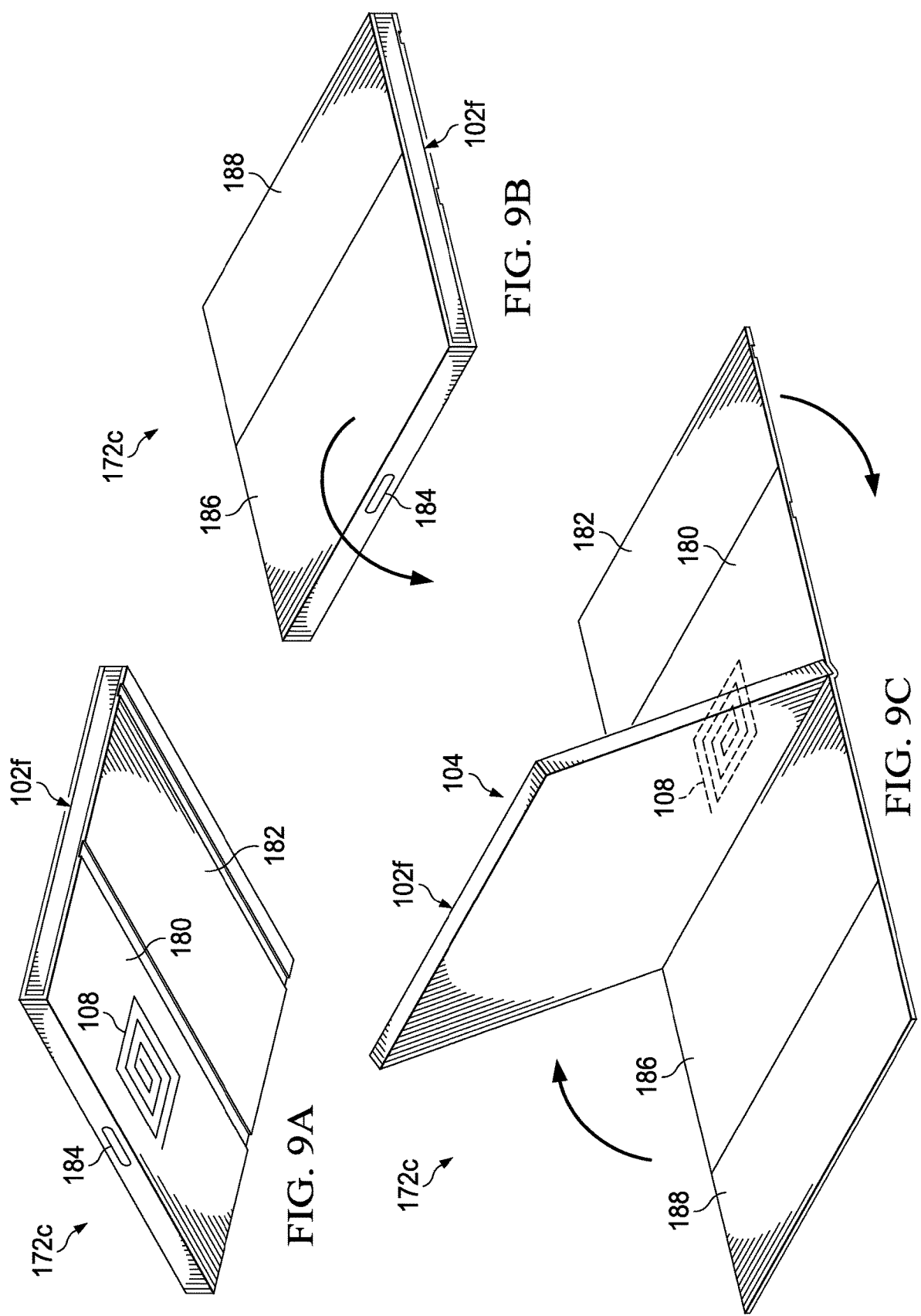

* # WIRELESS CHARGING STAND

CROSS-REFERENCE TO RELATED APPLICATION

This Application is a national stage application under 35 U.S.C. § 371 of PCT Application PCT/US2015/052358, filed Sep. 25, 2015 and entitled "WIRELESS CHARGING STAND," which is hereby incorporated by reference in its entirety.

TECHNICAL FIELD

This disclosure relates in general to the field of electronic devices, and more particularly, to a wireless charging stand for an electronic device.

BRIEF DESCRIPTION OF THE DRAWINGS

To provide a more complete understanding of the present disclosure and features and advantages thereof, reference is made to the following description, taken in conjunction with the accompanying FIGURES, embodiments are illustrated by way of example and not by way of limitation in the FIGURES of the accompanying drawings, in which like references indicate similar elements and in which:

FIG. 1A is a simplified schematic diagram illustrating an plan view of an embodiment of an electronic device with a wireless charging stand, in accordance with one embodiment of the present disclosure;

FIG. 1B is a simplified schematic diagram illustrating an plan view of an embodiment of an electronic device with a wireless charging stand, in accordance with one embodiment of the present disclosure;

FIG. 1C is a simplified schematic diagram illustrating an plan view of an embodiment of an electronic device with a wireless charging stand, in accordance with one embodiment of the present disclosure;

FIG. 1D is a simplified schematic diagram illustrating an plan view of an embodiment of an electronic device with a wireless charging stand, in accordance with one embodiment of the present disclosure;

FIG. 2A is a simplified schematic diagram illustrating an plan view of an embodiment of a wireless charging stand, in accordance with one embodiment of the present disclosure;

FIG. 2B is a simplified schematic diagram illustrating an plan view of an embodiment of a wireless charging stand, in accordance with one embodiment of the present disclosure;

FIG. 5A is a simplified schematic diagram illustrating an plan view of an embodiment of an electronic device with a wireless charging stand, in accordance with one embodiment of the present disclosure;

FIG. 5B is a simplified schematic diagram illustrating an orthographic view of an embodiment of an electronic device with a wireless charging stand, in accordance with one embodiment of the present disclosure;

FIG. 5E is a simplified schematic diagram illustrating an plan view of an embodiment of an electronic device with a wireless charging stand, in accordance with one embodiment of the present disclosure;

FIG. 5F is a simplified schematic diagram illustrating an plan view of a portion of an embodiment of an electronic device with a wireless charging stand, in accordance with one embodiment of the present disclosure;

FIG. 7A is a simplified schematic diagram illustrating an plan view of an embodiment of an electronic device with a wireless charging sleeve or stand, in accordance with one embodiment of the present disclosure;

FIG. 7B is a simplified schematic diagram illustrating an plan view of an embodiment of an electronic device with a wireless charging sleeve or stand, in accordance with one embodiment of the present disclosure;

FIG. 7C is a simplified schematic diagram illustrating an plan view of an embodiment of an electronic device with a wireless charging sleeve or stand, in accordance with one embodiment of the present disclosure;

FIG. 9A is a simplified schematic diagram illustrating an plan view of an embodiment of an electronic device with a wireless charging sleeve or stand, in accordance with one embodiment of the present disclosure;

FIG. 9B is a simplified schematic diagram illustrating an plan view of an embodiment of an electronic device with a wireless charging sleeve or stand, in accordance with one embodiment of the present disclosure;

FIG. 9C is a simplified schematic diagram illustrating an plan view of an embodiment of an electronic device with a wireless charging sleeve or stand, in accordance with one embodiment of the present disclosure;

Figure 2C:
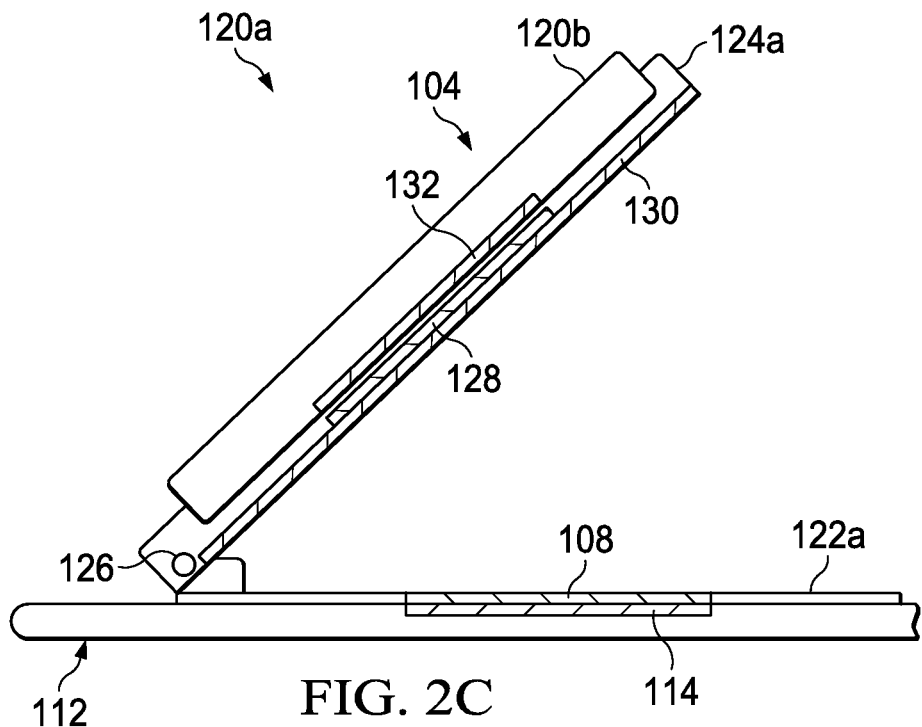
FIG. 2C is a simplified schematic diagram illustrating an plan view of an embodiment of an electronic device with a wireless charging stand, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

FIG. 1A is a simplified plan view illustrating an embodiment of an electronic device 102a in accordance with one embodiment of the present disclosure. Electronic device 102a can include a display 104 and a wireless charging stand 106. Wireless charging stand 106 can include a power receiving unit (PRU) 108 and a hinge 110. Hinge 110 can define an axis of rotation that is shared between electronic device 102a and wireless charging stand 106. PRU 108 can include a coil and charging circuit.

Turning to FIG. 1B, FIG. 1B is a simplified plan view illustrating an embodiment of electronic device 102a in accordance with one embodiment of the present disclosure. As illustrated in FIG. 1B, electronic device 102a has been positioned on a surface 112. Surface 112 may be a charging station and can include a power transmitting unit (PTU) 114. In an example, to enable wireless charging of electronic device 102a, PRU 108 needs to be positioned directly over PTU 114. In another example, PRU 108 does not need to be positioned directly over PTU 114 to enable wireless charging. As disclosed herein, different types of PRUs and PTUs may be used to allow for the wireless charging features disclosed.

Turning to FIG. 1C, FIG. 1C is a simplified plan view illustrating an embodiment of an electronic device 102a in accordance with one embodiment of the present disclosure. As illustrated in FIG. 1C, electronic device 102a has been rotated about hinge 110. Wireless changing stand 106 can remain on surface 112 and PRU 108 can remain positioned over PTU 114 to continue to allow for wireless charging of electronic device 102a. In an example, a user of electronic device 102a may have rotated electronic device 102aa on hinge 110 to create a better viewing angle of display 104.

Turning to FIG. 1D, FIG. 1D is a simplified plan view illustrating an embodiment of an electronic device 102a in accordance with one embodiment of the present disclosure. Wireless charging stand 106 can include a kickstand 118. Kickstand 118 can be rotated about kickstand hinge 116. As illustrated in FIG. 1D, kickstand 118 can provide support for electronic device 102a while allowing PRU 108 to remain positioned over PTU 114 to continue to facilitate wireless charging of electronic device 102a.

In an example, electronic device 102a may be a laptop computer, mobile device, personal digital assistant, smartphone, tablet, or other similar device that is wirelessly charged. Electronic device 102a can include various components of the internal electronic system of electronic device 102a. The components may include a central processing unit (CPU), a memory, etc. Any processors (inclusive of digital signal processors, microprocessors, supporting chipsets, etc.), memory elements, etc. can be suitably coupled to a motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

For purposes of illustrating certain example features of electronic device 102a, the following foundational information may be viewed as a basis from which the present disclosure may be properly explained. Charging stands are often bulky and require an electrical socket that plugs into an electrical device. Wireless charging stands can charge an electrical device without having to plug in the electrical device but these charging stands are meant to be static personal charging stands for use on a user's desk, nightstand, etc. and are flat surfaces typically on a desk or table. Some public locations, (e.g., airports, cafes, hotels, etc.) have a wireless charging pad built into flat surfaced furniture, such as tables. These flat pads are preferred as they are less intrusive, easier to clean/maintain and allow for many difference devices (e.g., laptop, phone, wearable, etc.) to be charged on one type of pad.

Unfortunately, the flat surface can create an issue with the viewing angle because wireless charging requires that the device and the charge pad are usually no more than a few centimeters apart. One of the challenges for wireless charging is that the device being charged has to be flat on the charging pad in order to be charge. For a hand-held form factor, such as a phone or a tablet, this means that the device's display is often not at a desired interaction distance and orientation because the display is flat on the charging pad. This requires the user to hunch over the device to interact with it while on the charging pad. Some charging pads have a custom, angled charging area but these are not typically installed in public spaces as this limits the capacity and type of devices that can be charged. What is needed is charging pad that can allow a user to adjust the orientation of the display without losing wireless charging capability.

An electronic device with a wireless changing stand, as outlined in FIGS. 1A-1D, can resolve these issues (and others). Electronic device 102a can include wireless charging stand 106. Wireless charging stand 106 can be configured to allow charging of electronic device 102a while still allowing a user to adjust the viewing angle of display 104 on electronic device 102a. The wireless charging stand can be configured to allow the user to angle the device towards themselves for better interaction and still maintain a charge by passing the magnetic induction through a receiving antenna (e.g. PRU 108 or an element, mechanism, component, etc. of PRU 108) positioned on the charge pad (e.g., PTU 114). The receiving antenna can be attached to the wireless charging circuit by a direct cable as normal, but its length and flexibility allows for the positioning of the antenna relative to the associated circuitry to be varied. The wireless charging stand can either be integrated into the device or into an aftermarket wireless charging case a sled as illustrated in FIGS. 6A-12D. In an example, the wireless charging stand may be a clamshell like folding stand that has the receiving antenna in the base of the wireless charging stand. A hinge can allow a user to vary the angle of the stand and the wireless charging stand can fold flat when not in use for transport. In another example, the wireless charging stand may include a foldable screen cover that folds back and slots into a notch on the back to form a stable stand. The section or portion of the cover that is flat can include the receiving antenna. This allows for the proximity and orientation of the receiving antenna to be properly positioned on the charging pad while still allowing the device to be oriented towards the user for a good viewing and interaction experience. Because the orientation of the receiving antenna is independent of the device (e.g., by providing a longer, flexible connector between the receiving antenna and the rest of the power circuitry) many different orientations of electronic device 102a can be achieved without compromising the coupling of the wireless charging.

Turning to FIG. 2A, FIG. 2A is a simplified plan view illustrating an embodiment of wireless charging stand 120a in accordance with one embodiment of the present disclosure. Wireless charging stand 120a can include PRU 108, a base 122a, an electronic device cradle 124a, a base hinge 126, a stand PTU 128, and ferromagnetic material 130. Base hinge 126 can define an axis of rotation that is shared between base 122 and electronic device cradle 124a. Electronic device cradle 124a can be configured to support an electronic device in multiple different angles. Stand PTU 128 can be configured to receive wireless power from PRU 108 when wireless charging stand 120a is in a closed configuration as shown in FIG. 2A. Ferromagnetic material 130 can help isolate stand PTU 128 and PRU 108 to ensure the required resonance is achieved for wireless charging.

Turning to FIG. 2B, FIG. 2B is a simplified plan view illustrating an embodiment of wireless charging stand 120a in accordance with one embodiment of the present disclosure. As illustrated in FIG. 2B, wireless charging stand 120a has been placed on surface 112 and PRU 108 has been positioned on PTU 114. Electronic device cradle 124 has been rotated away from base 122a leaving base 122a on surface 112 and PRU 108 over PTU 114. Electronic device 102b can include a device PRU 132 to allow for wireless charging of electronic device 102b.

Turning to FIG. 2C, FIG. 2C is a simplified plan view illustrating an embodiment of wireless charging stand 120a in accordance with one embodiment of the present disclosure. As illustrated in FIG. 2C, electronic device 102b has been placed on electronic device cradle 124a. Electronic device cradle 124a can have a profile such that when electronic device 102b is placed on electronic device cradle 124a, device PRU 132 can be in a proper position relative to stand PTU 128 to wireless charge electronic device 102b.

Figure 2D:
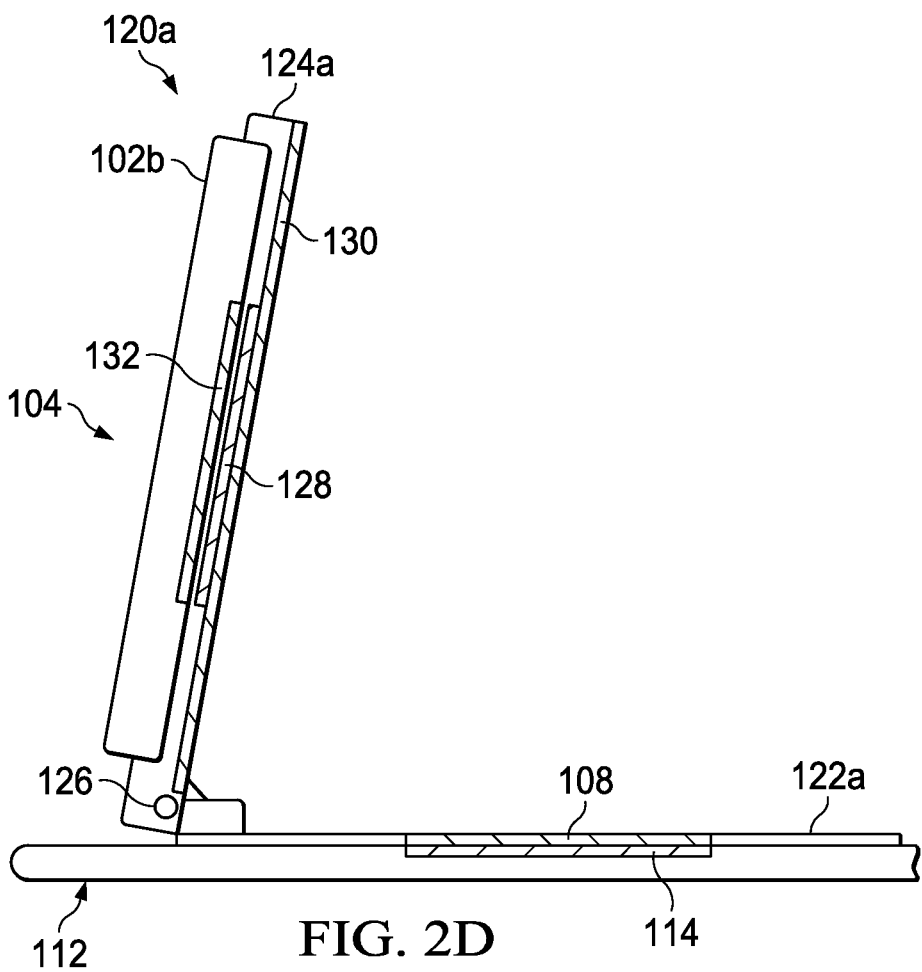
FIG. 2D is a simplified schematic diagram illustrating an plan view of an embodiment of an electronic device with a wireless charging stand, in accordance with one embodiment of the present disclosure.

Turning to FIG. 2D, FIG. 2D is a simplified plan view illustrating an embodiment of wireless charging stand 120a in accordance with one embodiment of the present disclosure. As illustrated in FIG. 2D, electronic device cradle 124a has been rotated along base hinge 126 to adjust an angle of electronic device 102b. PRU 108 can be wireless charged from PTU 114 and the charge or power can be transferred, conducted, or otherwise communicated to stand PTU 128 using charging path 170. Charging path 170 can be an impedance circuit or some other means of transferring, conducting, or otherwise communicating a charge or power from PRU 108 to PTU 128. Stand PTU 128 can then wirelessly charge electronic device 102b using device PRU 132 while allowing the angle (e.g., viewing angle) of electronic device 102b to be adjusted.

Figure 3A:
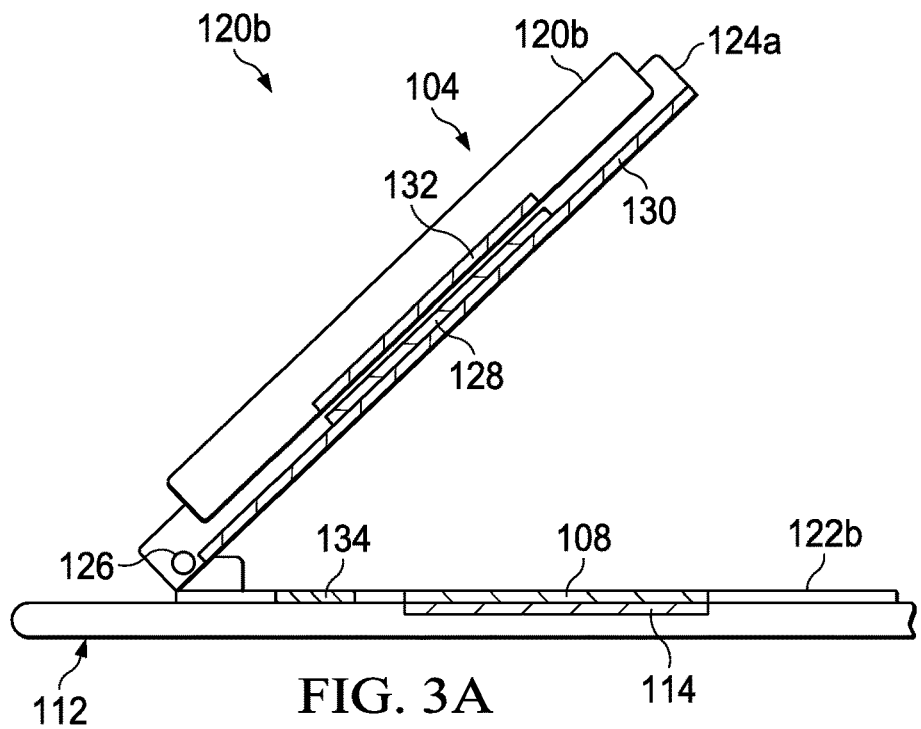
FIG. 3A is a simplified schematic diagram illustrating an plan view of an embodiment of an electronic device with a wireless charging stand, in accordance with one embodiment of the present disclosure.

Turning to FIG. 3A, FIG. 3A is a simplified plan view illustrating an embodiment of wireless charging stand 120b in accordance with one embodiment of the present disclosure. Wireless charging stand 120b can include PRU 108, a base 122b, electronic device cradle 124a, base hinge 126, stand PTU 128, and ferromagnetic material 130. Base 122b can include resonance circuitry 134. Resonance circuitry 134 can help create the resonance energy that helps enable the wireless charging and allow PRU 108 to be wireless charged from PTU 114, transmit the charge to stand PTU 128, and stand PTU 128 to wirelessly charge electronic device 102b using device PRU 132.

Figure 3B:
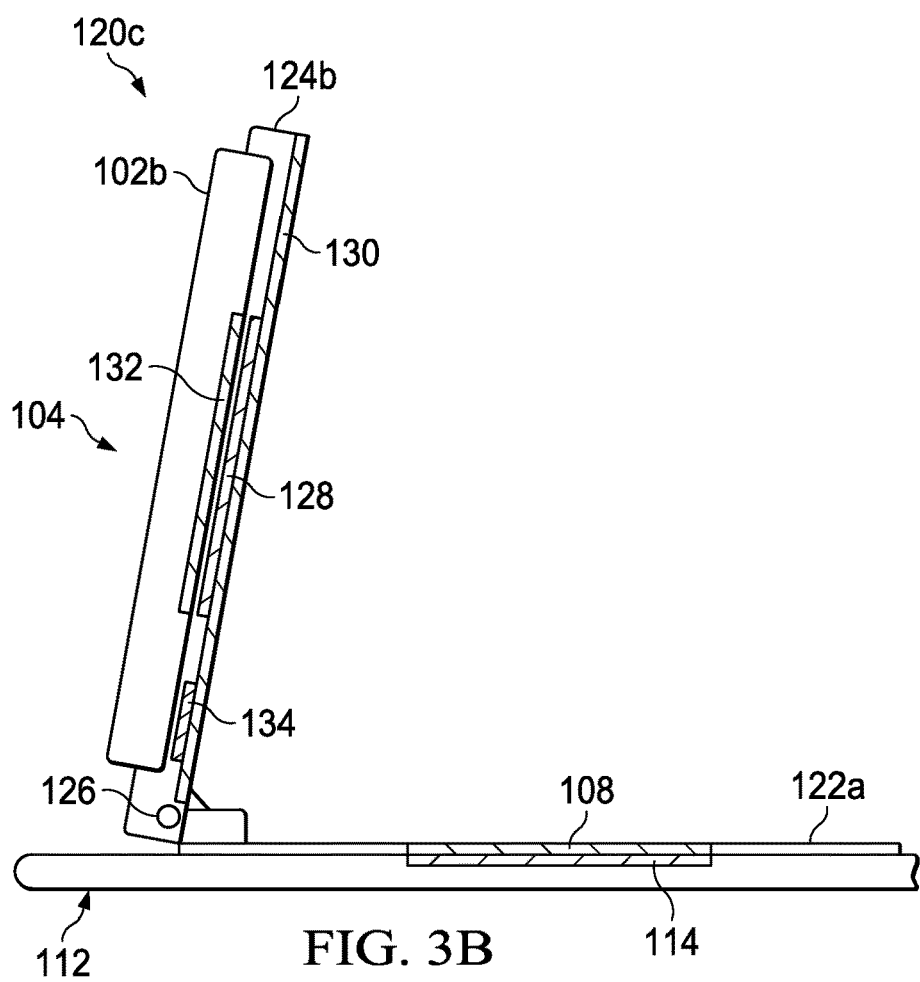
FIG. 3B is a simplified schematic diagram illustrating an plan view of an embodiment of an electronic device with a wireless charging stand, in accordance with one embodiment of the present disclosure.

Turning to FIG. 3B, FIG. 3B is a simplified plan view illustrating an embodiment of wireless charging stand 120c in accordance with one embodiment of the present disclosure. Wireless charging stand 120c can include PRU 108, a base 122a, electronic device cradle 124b, base hinge 126, stand PTU 128, and ferromagnetic material 130. Electronic device cradle 124b can include resonance circuitry 134. Resonance circuitry 134 can help create the resonance energy that helps enable the wireless charging and allow PRU 108 to be wireless charged from PTU 114, transmit the charge to stand PTU 128, and stand PTU 128 can wirelessly charge electronic device 102b using device PRU 132.

Figure 4A:
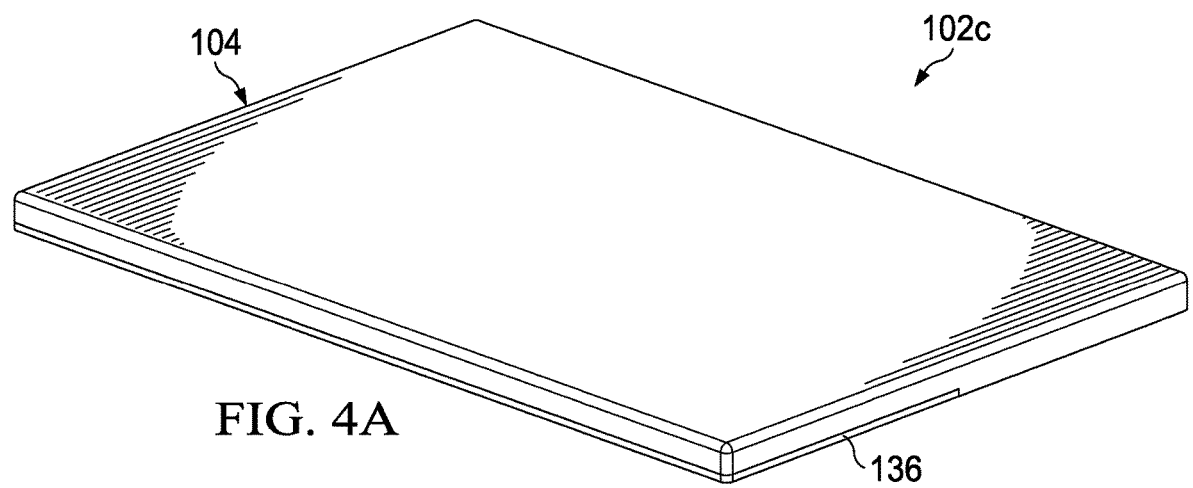
FIG. 4A is a simplified schematic diagram illustrating an orthographic view of an embodiment of an electronic device with a wireless charging stand, in accordance with one embodiment of the present disclosure.

Turning to FIG. 4A, FIG. 4A is a simplified plan view of an electronic device 102c, in accordance with one embodiment of the present disclosure. Electronic device 102c can include a multi-device wireless charging stand 136. In an embodiment, multi-device wireless charging stand 136 can allow electronic device 102c to be wirelessly charged as described herein or using other wirelessly charging means.

Figure 4B:
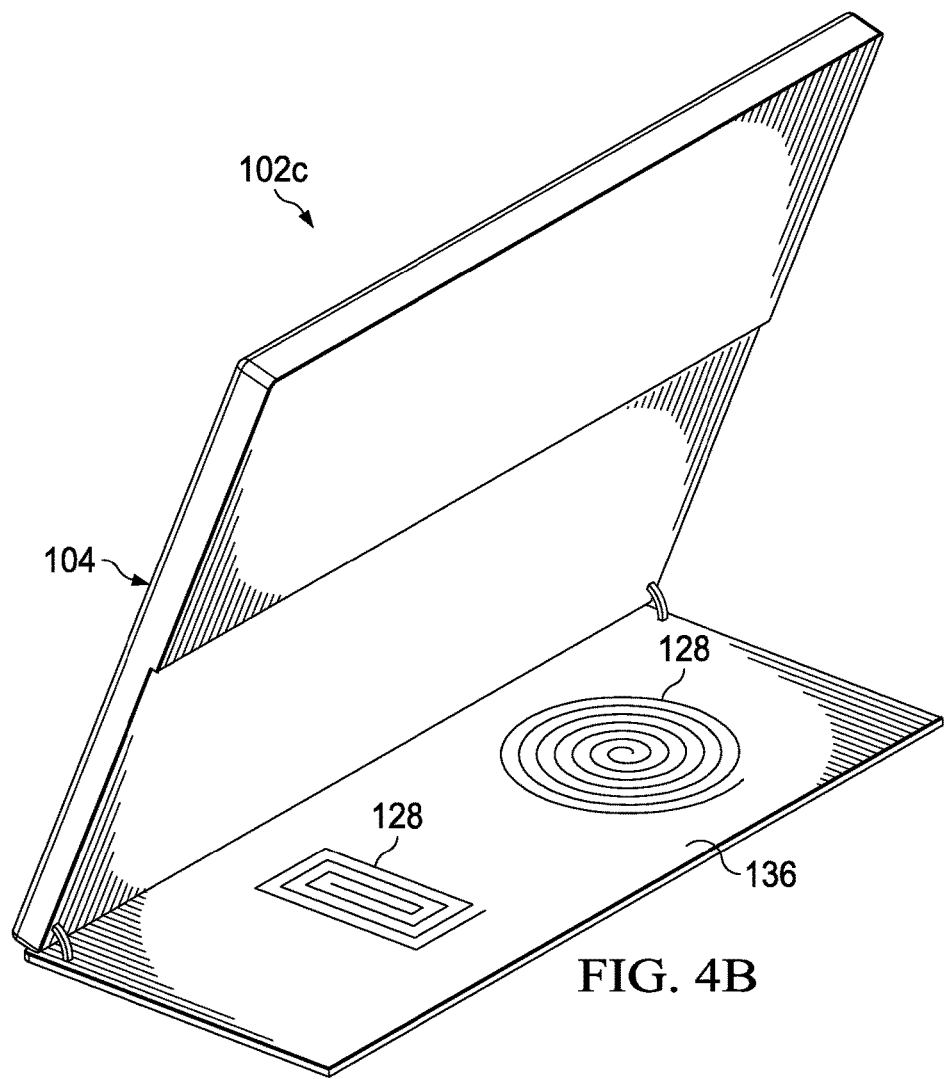
FIG. 4B is a simplified schematic diagram illustrating an orthographic view of an embodiment of an electronic device with a wireless charging stand, in accordance with one embodiment of the present disclosure

Turning to FIG. 4B, FIG. 4B is a simplified orthographic view illustrating an embodiment of an electronic device 102c, in accordance with one embodiment of the present disclosure. Multi-device wireless charging stand 136 can be configured to rotate to an open position and support electronic device 102c and allow for the angle (e.g., viewing angle) of electronic device 102c to be changed. In addition, multi-device wireless charging stand 136 can include one or more stand PTUs 128.

Figure 4C:
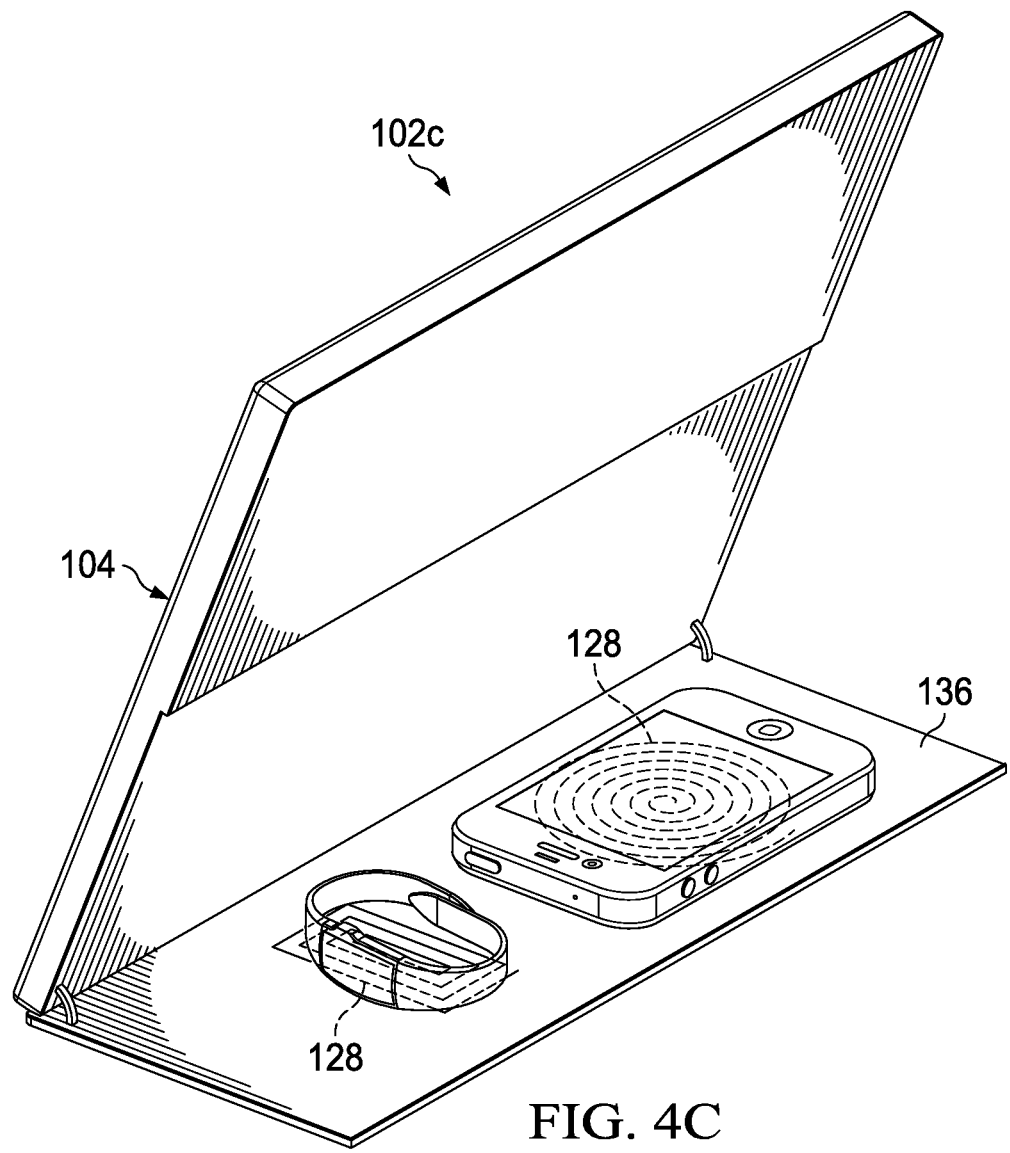
FIG. 4C is a simplified schematic diagram illustrating an orthographic view of an embodiment of an electronic device with a wireless charging stand, in accordance with one embodiment of the present disclosure.

Turning to FIG. 4C, FIG. 4C is a simplified orthographic view illustrating an embodiment of an electronic device 102c, in accordance with one embodiment of the present disclosure. Multi-device wireless charging stand 136 can be configured to wirelessly charge multiple device at the same time. In an example, each one or more stand PTU 128 may be designated for a specific device. For example, one PTU 128 may be designated to wirelessly charge a wearable while another PTU 128 may be designated to wirelessly charge a smartphone. Power for PTU 128 can be supplied by electronic device 102 or from a charging surface similar to the configuration illustrated in FIGS. 2A and 2B Turning to FIG. 5A, FIG. 5A is a simplified a plan view illustrating an embodiment of an electronic device 102d, in accordance with one embodiment of the present disclosure. Electronic device 102d can include convertible stand 138. Convertible stand 138 can include a surface support portion 140, a transition portion 142, and a kickstand portion 144. Surface support portion 140 can include PRU 108.

Turning to FIG. 5B, FIG. 5B is a simplified orthographic view illustrating an embodiment of an electronic device 102d, in accordance with one embodiment of the present disclosure. As illustrated in FIG. 5B, kickstand portion 144 can be rotated about a kickstand portion hinge 146 and support electronic device 102d.

Figure 5C:
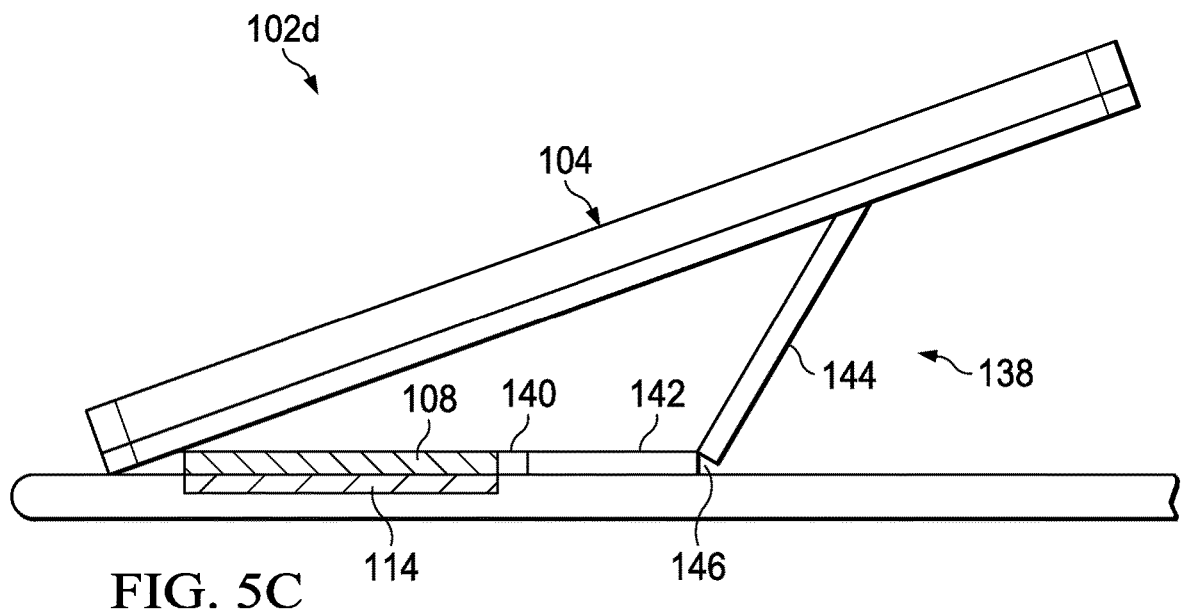
FIG. 5C is a simplified schematic diagram illustrating an plan view of an embodiment of an electronic device with a wireless charging stand, in accordance with one embodiment of the present disclosure.

Turning to FIG. 5C, FIG. 5C is a simplified orthographic view illustrating an embodiment of an electronic device 102d, in accordance with one embodiment of the present disclosure. As illustrated in FIG. 5C, kickstand portion 144 can be rotated about kickstand portion hinge 146 and support electronic device 102d in a configuration that will allow surface support portion 140 to lay flat on a surface and allow PRU 108 to be properly positioned over PTU 114 to allow electronic device 102d to be wirelessly charged.

Figure 5D:
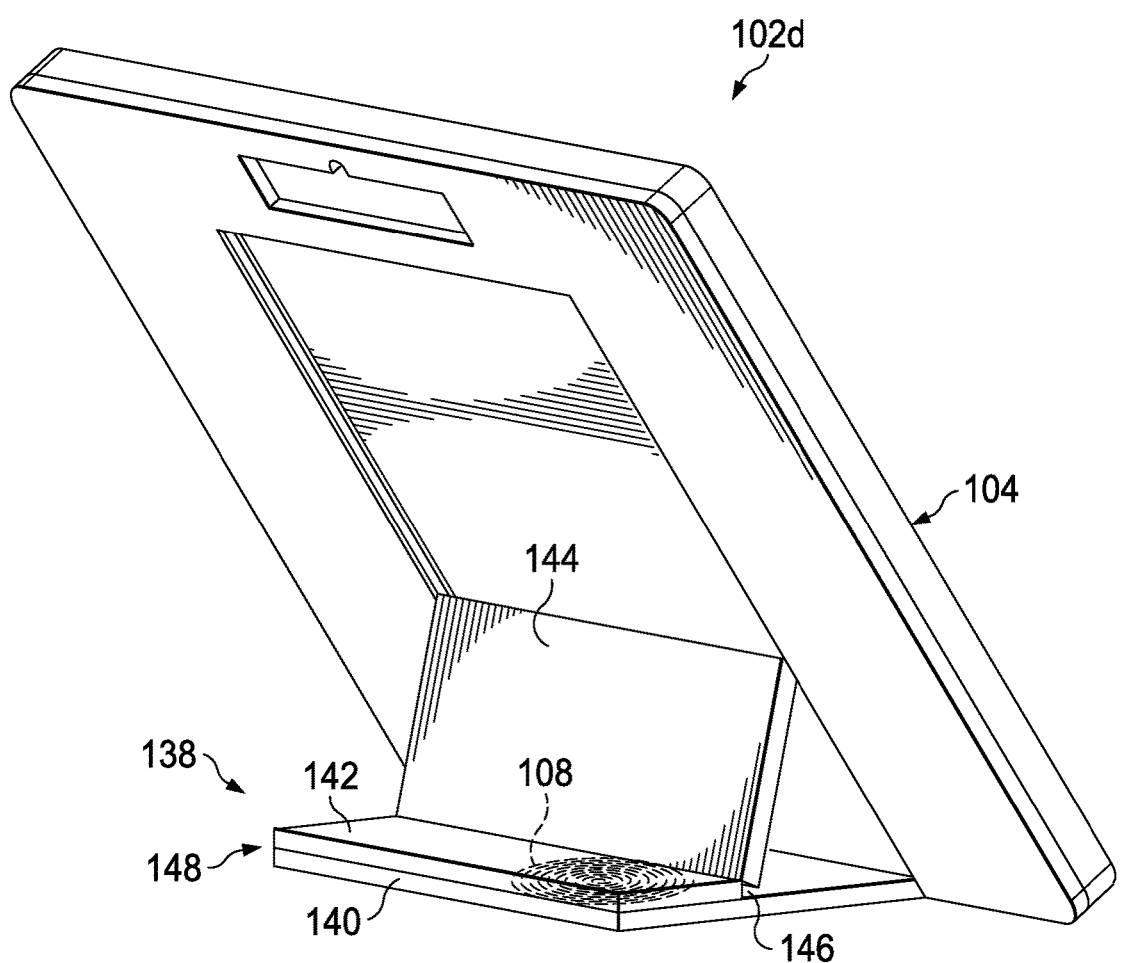
FIG. 5D is a simplified schematic diagram illustrating an orthographic view of an embodiment of an electronic device with a wireless charging stand, in accordance with one embodiment of the present disclosure.

Turning to FIG. 5D, FIG. 5D is a simplified orthographic view illustrating an embodiment of an electronic device 102d, in accordance with one embodiment of the present disclosure. As illustrated in FIG. 5D, transition portion 142 has been rotated about transition hinge 148 such that transition portion 142 rests on top of surface support portion 140. Kickstand portion 144 can be rotated about kickstand portion hinge 146 to allow for the rotation by transition portion 142. This configuration can allow for a greater viewing angle of display 104 than the configuration illustrated in FIG. 5C.

Turning to FIG. 5E, FIG. 5E is a simplified orthographic view illustrating an embodiment of an electronic device 102d, in accordance with one embodiment of the present disclosure. As illustrated in FIG. 5E, transition portion 142 has been rotated about transition hinge 148 allow for a greater viewing angle of display 104 than the configuration illustrated in FIG. 5C. This configuration can still allow surface support portion 140 to lay flat on a surface and allow PRU 108 to be properly positioned over PTU 114 to allow electronic device 102d to be wirelessly charged.

Turning to FIG. 5F, FIG. 5F is a simplified orthographic view illustrating an embodiment of a portion of an electronic device 102d, in accordance with one embodiment of the present disclosure. Electronic device 102d can include guiderails 150 and kickstand portion 144 can include guideposts 152. In an example, guideposts 152 can travel along guiderails 150 to help guide kickstand portion 144 into the different configurations illustrated in FIGS. 5A-5E.

Figure 6A:
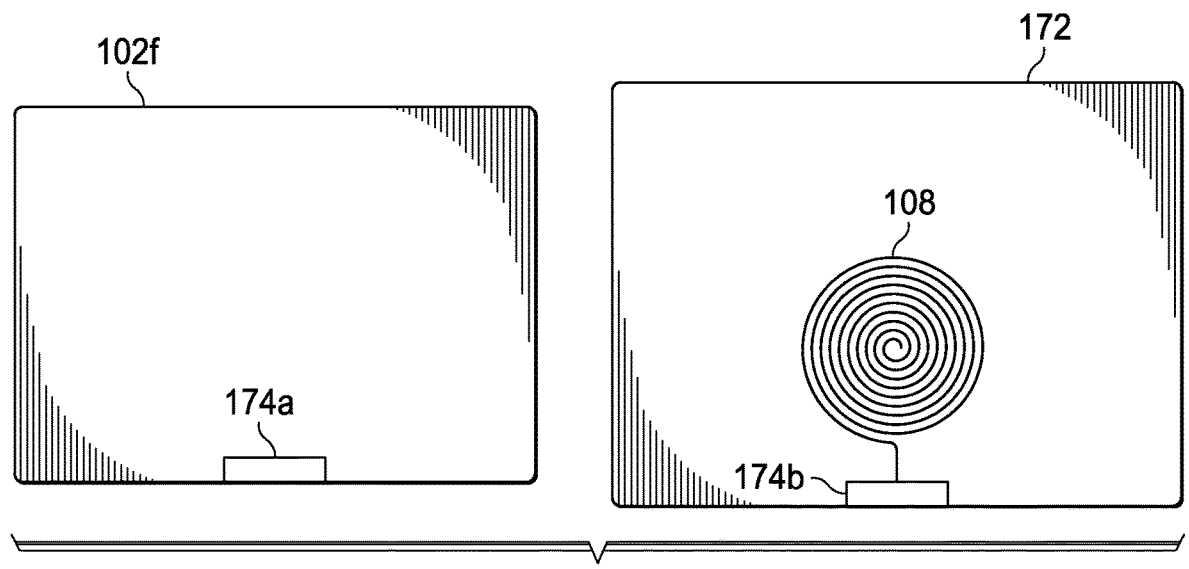
FIG. 6A is a simplified schematic diagram illustrating an plan view of an embodiment of an electronic device with a wireless charging sleeve or stand, in accordance with one embodiment of the present disclosure.

Turning to FIG. 6A, FIG. 6A is a simplified a plan view illustrating an embodiment of an electronic device 102f, in accordance with one embodiment of the present disclosure. Electronic device 102f can include a sleeve interconnect 174a. A sleeve 172 can include PRU 108 and a mating interconnect 174b. Mating interconnect 174b can be configured to mate or couple with sleeve interconnect 174a and transfer, conduct, or otherwise communicate a charge or power from PRU 108 to electronic device 102f.

Figure 6B:
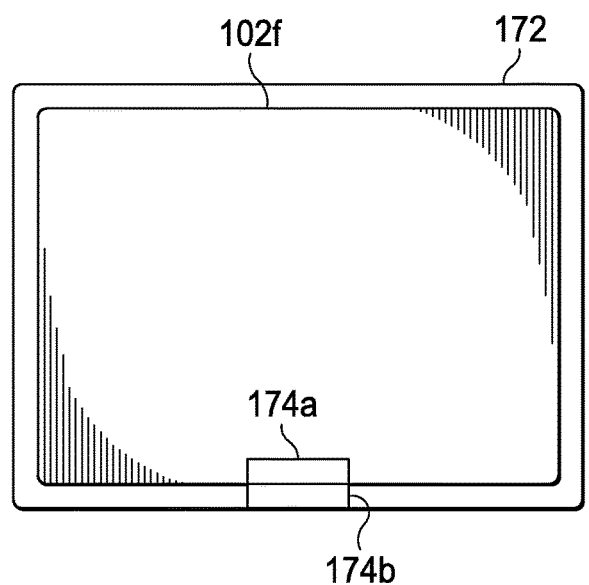
FIG. 6B is a simplified schematic diagram illustrating an plan view of an embodiment of an electronic device with a wireless charging sleeve or stand, in accordance with one embodiment of the present disclosure.

Turning to FIG. 6B, FIG. 6B is a simplified plan view illustrating an embodiment of electronic device 102f coupled to sleeve 172, in accordance with one embodiment of the present disclosure. In an example, electronic device 102f is a device that cannot be wirelessly charged on its own. However, when electronic device 102f is coupled to sleeve 172, electronic device 102f can be wirelessly charged.

Turning to FIG. 7A, FIG. 7A is a simplified a plan view illustrating an embodiment of electronic device 102f coupled to a sleeve 172a, in accordance with one embodiment of the present disclosure. Sleeve 172a can include a base support 177 and PRU section 180. PRU section 180 can include PRU 108. Sleeve 172a be configured to allow PRU 108 to be positioned over a PTU (not shown) to allow wireless charging of electronic device 102f. PRU 108 on sleeve 172a can receive power from a PTU (not shown) and, when coupled together, mating interconnect 174b can transfer the power to sleeve interconnect 174a and charge electronic device 102f.

Turning to FIG. 7B, FIG. 7B is a simplified orthographic view illustrating an embodiment of electronic device 102f coupled to sleeve 172a, in accordance with one embodiment of the present disclosure. Sleeve 172a can include a first portion 178 and a second portion 176. As illustrated in FIG. 7B, first portion 178 and second portion 176 can cover or be positioned over display 104 (shown in FIG. 7C) of electronic device 102f.

Turning to FIG. 7C, FIG. 7C is a simplified orthographic view illustrating an embodiment of electronic device 102f coupled to sleeve 172a, in accordance with one embodiment of the present disclosure. As illustrated in FIG. 7C, first portion 178 and second portion 176 have been rotated away from electronic device 102f. When first portion 178 and second portion 176 have been rotated away from electronic device 102, display 104 is exposed or visible. Sleeve 172a can be configured to allow PRU section 180 and PRU 108 to remain positioned over a PTU (not shown) to allow wireless charging of electronic device 102f.

Figure 7D:
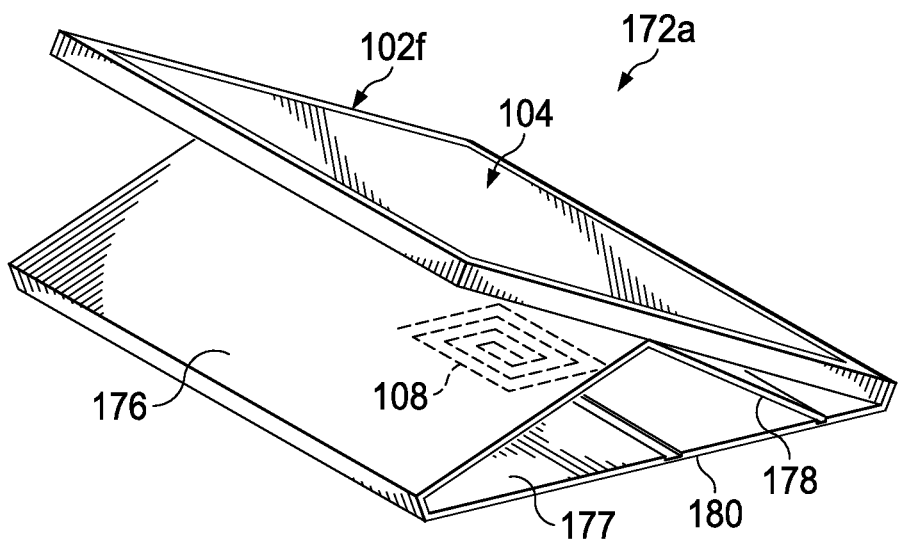
FIG. 7D is a simplified schematic diagram illustrating an plan view of an embodiment of an electronic device with a wireless charging sleeve or stand, in accordance with one embodiment of the present disclosure.

Turning to FIG. 7D, FIG. 7D is a simplified orthographic view illustrating an embodiment of electronic device 102f coupled to sleeve 172a, in accordance with one embodiment of the present disclosure. As illustrated in FIG. 7D, base support 177, first portion 178 and second portion 176 have been rotated or folded into a configuration that can support electronic device 102f at a desired view angle of display 104. Sleeve 172a can be configured to allow PRU section 180 and PRU 108 to remain positioned over a PTU (not shown) to allow wireless charging of electronic device 102f.

Figure 7E:
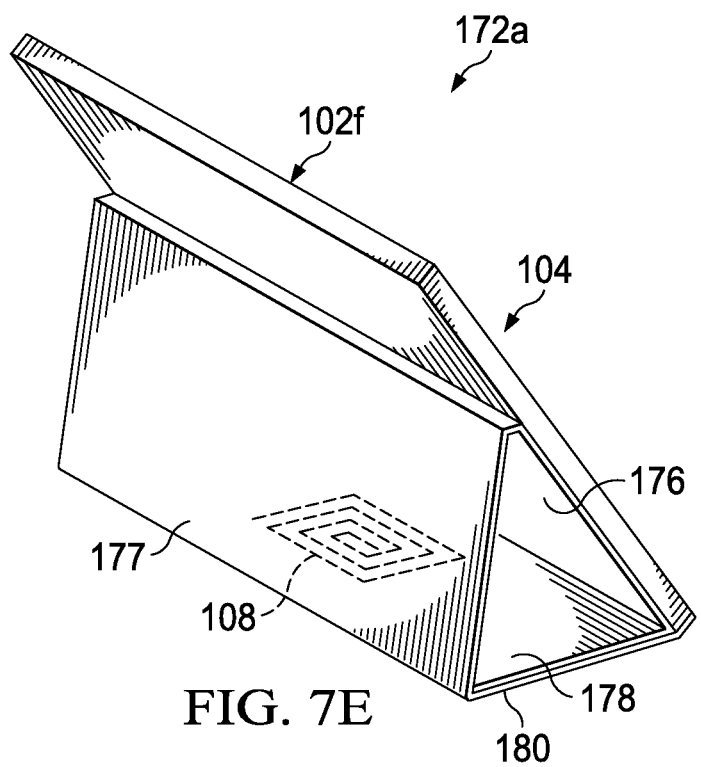
FIG. 7E is a simplified schematic diagram illustrating an plan view of an embodiment of an electronic device with a wireless charging sleeve or stand, in accordance with one embodiment of the present disclosure.

Turning to FIG. 7E, FIG. 7E is a simplified orthographic view illustrating an embodiment of electronic device 102f coupled to sleeve 172a, in accordance with one embodiment of the present disclosure. As illustrated in FIG. 7E, first portion 178 and second portion 176 have been rotated or folded into a configuration that can support electronic device 102f at a desired view angle of display 104. Sleeve 172a can be configured to allow PRU section 180 and PRU 108 to remain positioned over a PTU (not shown) to allow wireless charging of electronic device 102f. As illustrated in FIGS. 7B-7E, sleeve 172a can be configured to allow first portion 178 and second portion 176 to be rotated or folded into various different configurations while still allowing PRU section 180 and PRU 108 to remain positioned over a PTU (not shown) to allow wireless charging of electronic device 102f.

Figure 8A:
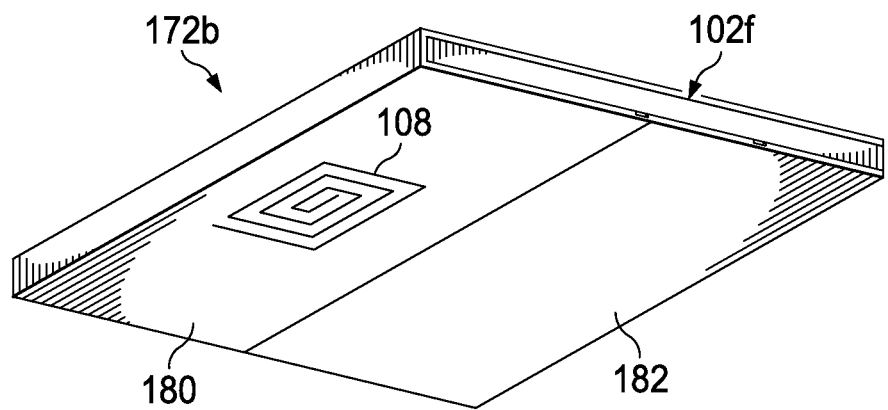
FIG. 8A is a simplified schematic diagram illustrating an plan view of an embodiment of an electronic device with a wireless charging sleeve or stand, in accordance with one embodiment of the present disclosure.

Turning to FIG. 8A, FIG. 8A is a simplified a plan view illustrating an embodiment of electronic device 102f coupled to a sleeve 172b, in accordance with one embodiment of the present disclosure. Sleeve 172b can include PRU section 180 and porch section 182. PRU section 180 can include PRU 108. Sleeve 172b be configured to allow PRU 108 to be positioned over a PTU (not shown) to allow wireless charging of electronic device 102f. PRU 108 on sleeve 172b can receive power from a PTU (not shown) and, when coupled together, mating interconnect 174b can transfer the power to sleeve interconnect 174a and charge electronic device 102f.

Figure 8B:
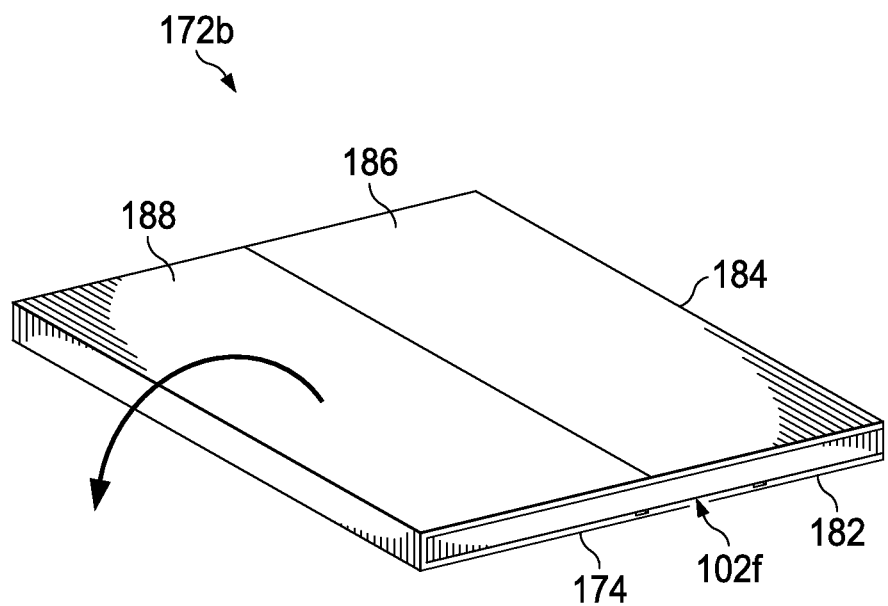
FIG. 8B is a simplified schematic diagram illustrating an plan view of an embodiment of an electronic device with a wireless charging sleeve or stand, in accordance with one embodiment of the present disclosure.

Turning to FIG. 8B, FIG. 8B is a simplified orthographic view illustrating an embodiment of electronic device 102f coupled to sleeve 172b, in accordance with one embodiment of the present disclosure. Sleeve 172b can include an interconnect portion 186 and a support portion 188. Interconnect portion 186 can included interconnect 184. Interconnect 184 can represent when sleeve interconnect 174a is coupled to mating interconnect 174b. As illustrated in FIG. 8B, interconnect portion 186 and support portion 188 can cover or be positioned over display 104 (shown in FIG. 8C) of electronic device 102f.

Figure 8C:
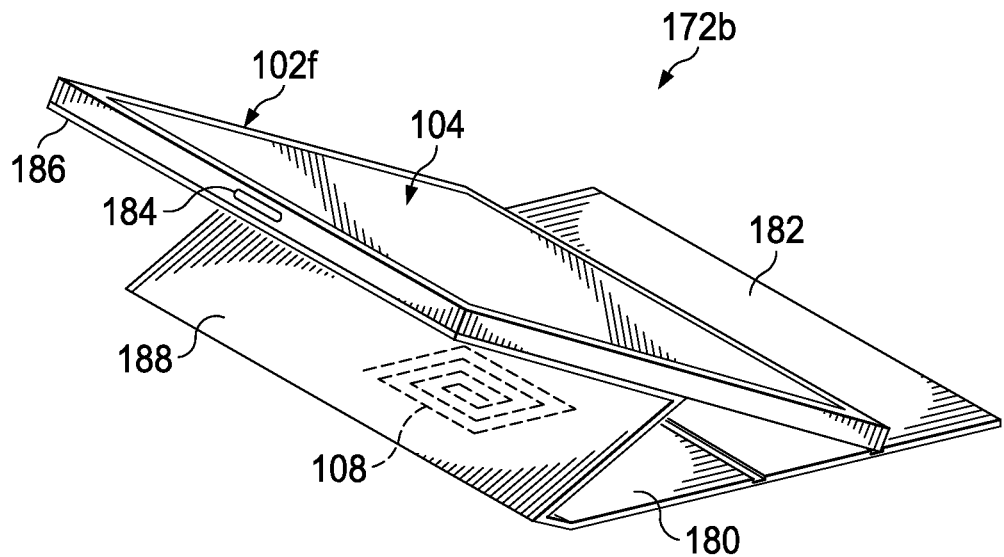
FIG. 8C is a simplified schematic diagram illustrating an plan view of an embodiment of an electronic device with a wireless charging sleeve or stand, in accordance with one embodiment of the present disclosure.

Turning to FIG. 8C, FIG. 8C is a simplified orthographic view illustrating an embodiment of electronic device 102f coupled to sleeve 172b, in accordance with one embodiment of the present disclosure. As illustrated in FIG. 8C, interconnect portion 186 and a support portion 188 have been rotated or folded into a configuration that can support electronic device 102f at a desired view angle of display 104. Sleeve 172b can be configured to allow PRU section 180 and PRU 108 to remain positioned over a PTU (not shown) to allow wireless charging of electronic device 102f using PRU 108 and interconnect 184.

Figure 8D:
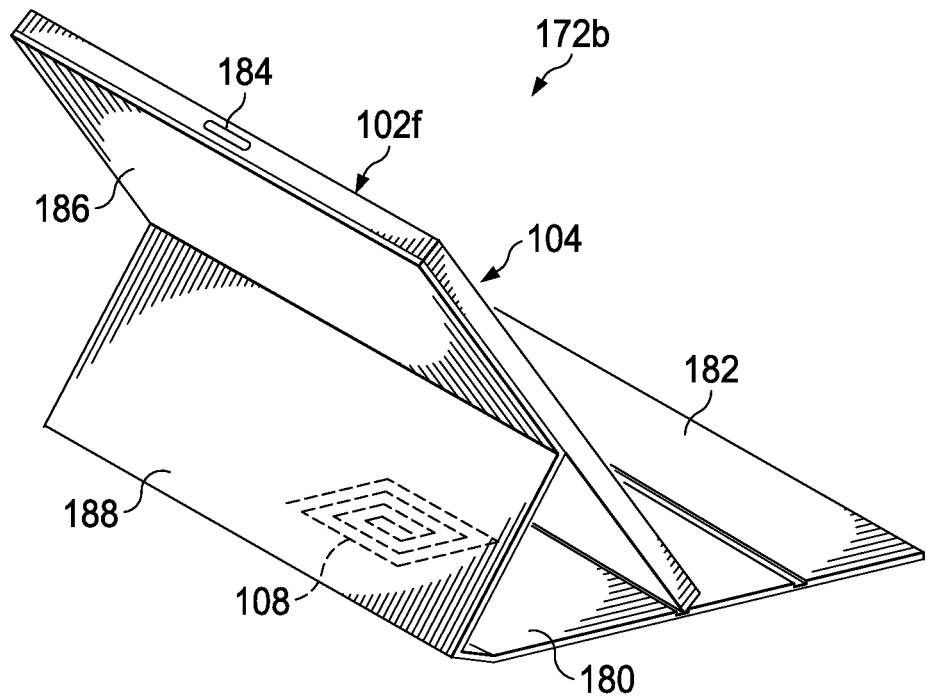
FIG. 8D is a simplified schematic diagram illustrating an plan view of an embodiment of an electronic device with a wireless charging sleeve or stand, in accordance with one embodiment of the present disclosure.

Turning to FIG. 8D, FIG. 8D is a simplified orthographic view illustrating an embodiment of electronic device 102f coupled to sleeve 172b, in accordance with one embodiment of the present disclosure. As illustrated in FIG. 8D, interconnect portion 186 and a support portion 188 have been rotated or folded into a configuration that can support electronic device 102f at a desired view angle of display 104. Sleeve 172b can be configured to allow PRU section 180 and PRU 108 to remain positioned over a PTU (not shown) to allow wireless charging of electronic device 102f using PRU 108 and interconnect 184. As illustrated in FIGS. 8B-8D, sleeve 172b can be configured to allow interconnect portion 186 and a support portion 188 to be rotated or folded into various different configurations while still allowing PRU section 180 and PRU 108 to remain positioned over a PTU (not shown) to allow wireless charging of electronic device 102f.

Turning to FIG. 9A, FIG. 9A is a simplified a plan view illustrating an embodiment of electronic device 102f coupled to a sleeve 172c, in accordance with one embodiment of the present disclosure. Sleeve 172c can include PRU section 180, porch section 182, and interconnect 184. PRU section 180 can include PRU 108. Sleeve 172c can be configured to allow PRU 108 to be positioned over a PTU (not shown) to allow wireless charging of electronic device 102f. PRU 108 on sleeve 172c can receive power from a PTU (not shown) and transfer the power to interconnect 184 and charge electronic device 102f.

Turning to FIG. 9B, FIG. 9B is a simplified orthographic view illustrating an embodiment of electronic device 102f coupled to sleeve 172c, in accordance with one embodiment of the present disclosure. Sleeve 172c can include interconnect portion 186 and support portion 188. Interconnect portion 186 can included interconnect 184. As illustrated in FIG. 9B, interconnect portion 186 and support portion 188 can cover or be positioned over display 104 (shown in FIG. 9C) of electronic device 102f.

Turning to FIG. 9C, FIG. 9C is a simplified orthographic view illustrating an embodiment of electronic device 102f coupled to sleeve 172c, in accordance with one embodiment of the present disclosure. As illustrated in FIG. 9C, interconnect portion 186 and support portion 188 have been rotated away from electronic device 102f and electronic device 102f has been raised or rotated up from PRU section 180 and porch section 182. In this configuration, display 104 is exposed or visible. Sleeve 172c can be configured to allow PRU section 180 and PRU 108 to remain positioned over a PTU (not shown) to allow wireless charging of electronic device 102f.

Figure 9D:
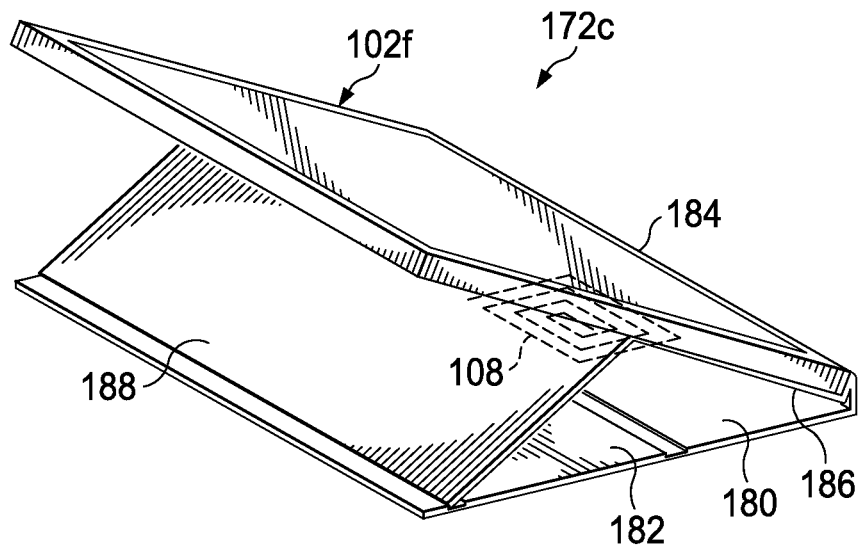
FIG. 9D is a simplified schematic diagram illustrating an plan view of an embodiment of an electronic device with a wireless charging sleeve or stand, in accordance with one embodiment of the present disclosure.

Turning to FIG. 9D, FIG. 9D is a simplified orthographic view illustrating an embodiment of electronic device 102f coupled to sleeve 172c, in accordance with one embodiment of the present disclosure. As illustrated in FIG. 9D, PRU section 180 and porch section 182 have been folded or rotated back. Also, interconnect portion 186 and a support portion 188 have been rotated or folded into a configuration that can support electronic device 102f at a desired view angle of display 104. Sleeve 172c can be configured to allow PRU section 180 and PRU 108 to remain positioned over a PTU (not shown) to allow wireless charging of electronic device 102f using PRU 108 and interconnect 184.

Figure 9E:
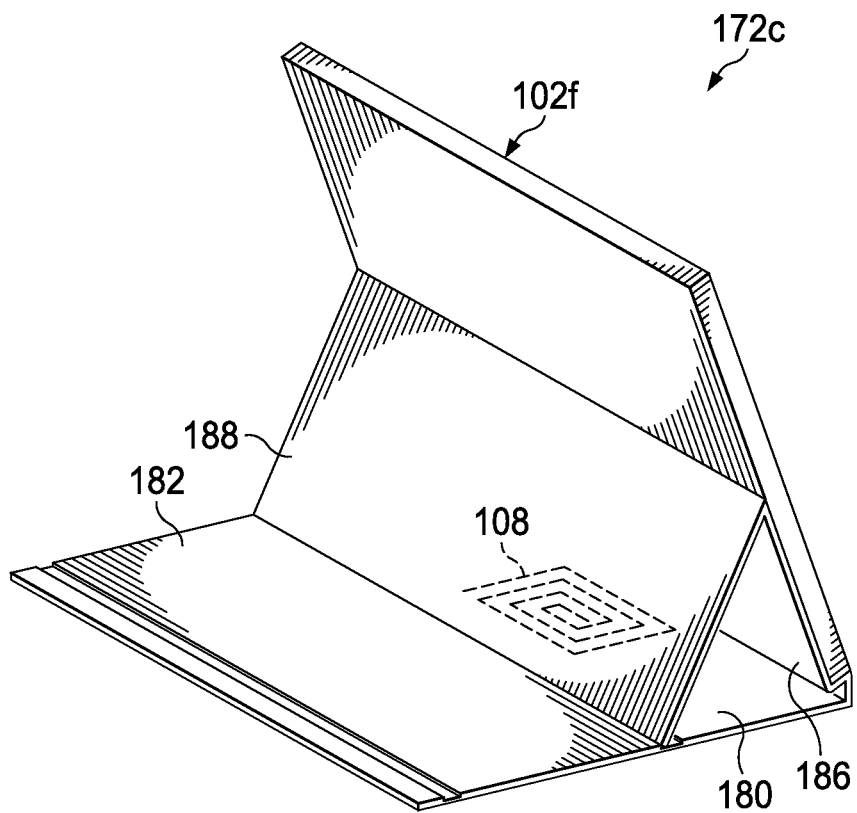
FIG. 9E is a simplified schematic diagram illustrating an plan view of an embodiment of an electronic device with a wireless charging sleeve or stand, in accordance with one embodiment of the present disclosure.

Turning to FIG. 9E, FIG. 9E is a simplified orthographic view illustrating an embodiment of electronic device 102f coupled to sleeve 172b, in accordance with one embodiment of the present disclosure. As illustrated in FIG. 9E, interconnect portion 186 and a support portion 188 have been rotated or folded into a configuration that can support electronic device 102f at a desired view angle of display 104. Sleeve 172c can be configured to allow PRU section 180 and PRU 108 to remain positioned over a PTU (not shown) to allow wireless charging of electronic device 102f using PRU 108 and interconnect 184. As illustrated in FIGS. 9B-9E, sleeve 172c can be configured to allow interconnect portion 186 and a support portion 188 to be rotated or folded into various different configurations while still allowing PRU section 180 and PRU 108 to remain positioned over a PTU (not shown) to allow wireless charging of electronic device 102f.

Figure 10A:
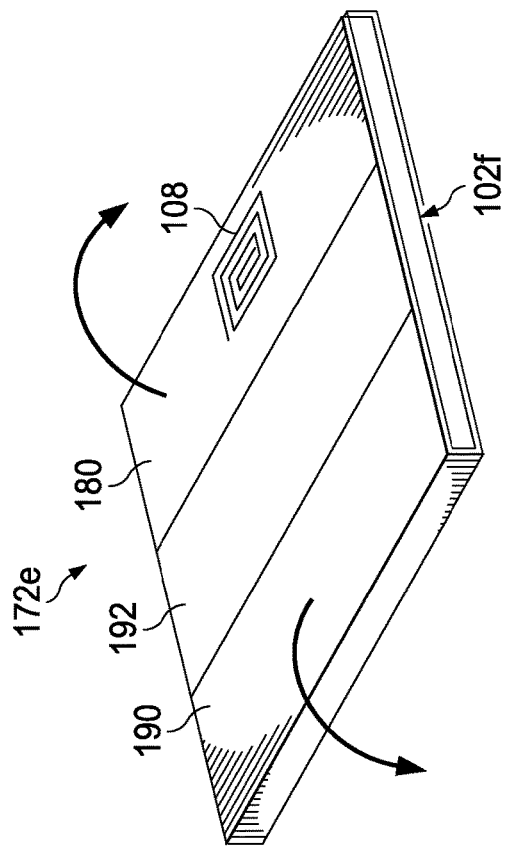
FIG. 10A is a simplified schematic diagram illustrating an plan view of an embodiment of an electronic device with a wireless charging sleeve or stand, in accordance with one embodiment of the present disclosure.

Turning to FIG. 10A, FIG. 10A is a simplified a plan view illustrating an embodiment of electronic device 102f coupled to a sleeve 172e, in accordance with one embodiment of the present disclosure. Sleeve 172e can include PRU section 180, first support section 190, and second support section 192. PRU section 180 can include PRU 108. Sleeve 172e can be configured to allow PRU 108 to be positioned over a PTU (not shown) to allow wireless charging of electronic device 102f. PRU 108 on sleeve 172e can receive power from a PTU (not shown) and transfer the power and charge electronic device 102f.

Figure 10B:
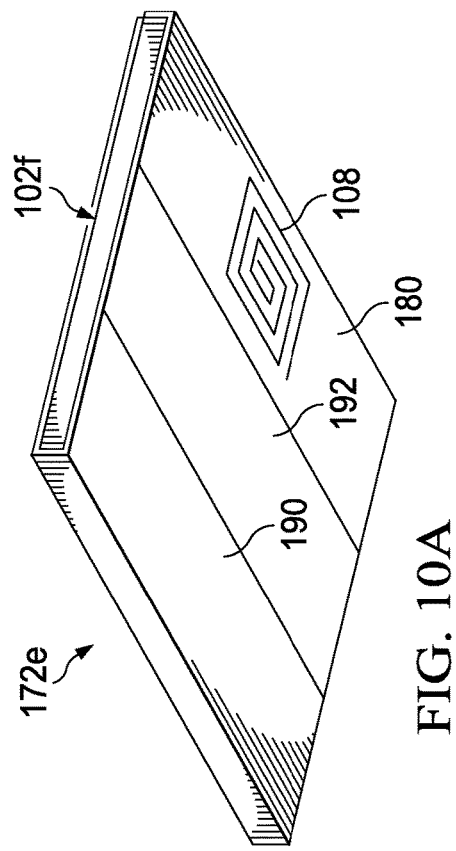
FIG. 10B is a simplified schematic diagram illustrating an plan view of an embodiment of an electronic device with a wireless charging sleeve or stand, in accordance with one embodiment of the present disclosure.

Turning to FIG. 10B, FIG. 10B is a simplified orthographic view illustrating an embodiment of electronic device 102f coupled to sleeve 172e, in accordance with one embodiment of the present disclosure. As illustrated in FIG. 10B, RU section 180, first support section 190, and second support section 192 can cover or be positioned over display 104 (shown in FIG. 10C) of electronic device 102f.

Figure 10C:
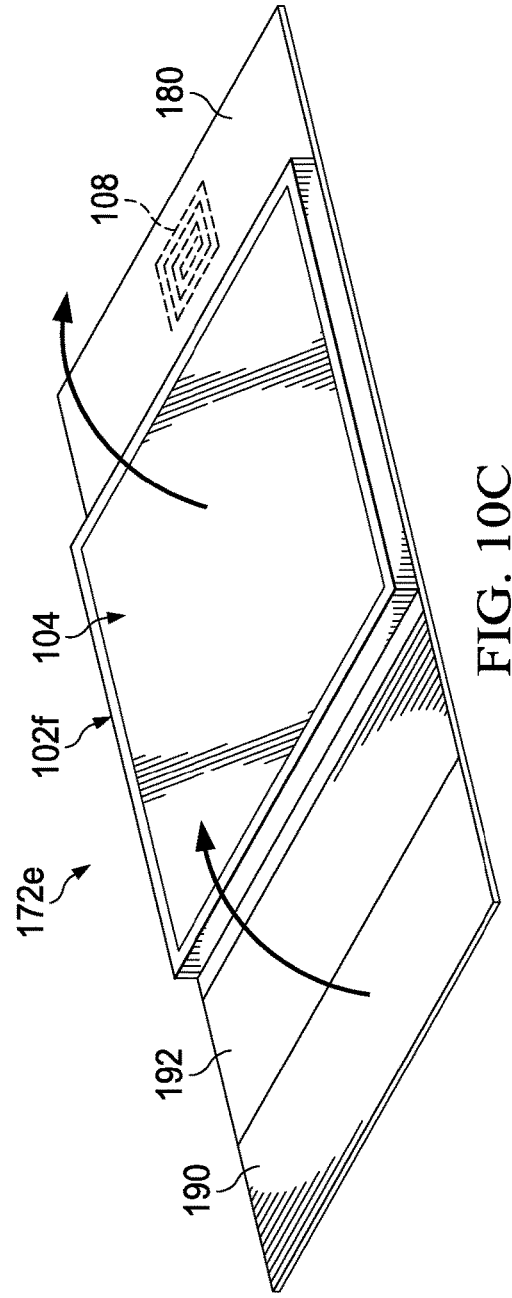
FIG. 10C is a simplified schematic diagram illustrating an plan view of an embodiment of an electronic device with a wireless charging sleeve or stand, in accordance with one embodiment of the present disclosure.

Turning to FIG. 10C, FIG. 10C is a simplified orthographic view illustrating an embodiment of electronic device 102f coupled to sleeve 172e, in accordance with one embodiment of the present disclosure. As illustrated in FIG. 10C, PRU section 180, first support section 190, and second support section 192 have been rotated away from electronic device 102f. In this configuration, display 104 is exposed or visible. Sleeve 172e can be configured to allow PRU section 180 and PRU 108 to be positioned over a PTU (not shown) to allow wireless charging of electronic device 102f.

Figure 10D:
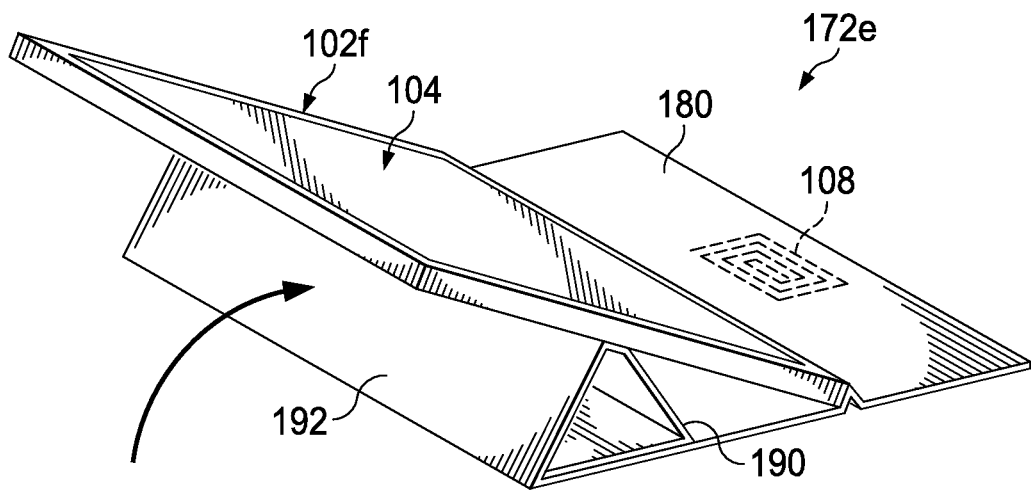
FIG. 10D is a simplified schematic diagram illustrating an plan view of an embodiment of an electronic device with a wireless charging sleeve or stand, in accordance with one embodiment of the present disclosure.

Turning to FIG. 10D, FIG. 10D is a simplified orthographic view illustrating an embodiment of electronic device 102f coupled to sleeve 172e, in accordance with one embodiment of the present disclosure. As illustrated in FIG. 10D, first support section 190 and second support section 192 have been rotated or folded into a configuration that can support electronic device 102f at a desired view angle of display 104. Sleeve 172e can be configured to allow PRU section 180 and PRU 108 to remain positioned over a PTU (not shown) to allow wireless charging of electronic device 102f using PRU 108 and interconnect 184.

Figure 10E:
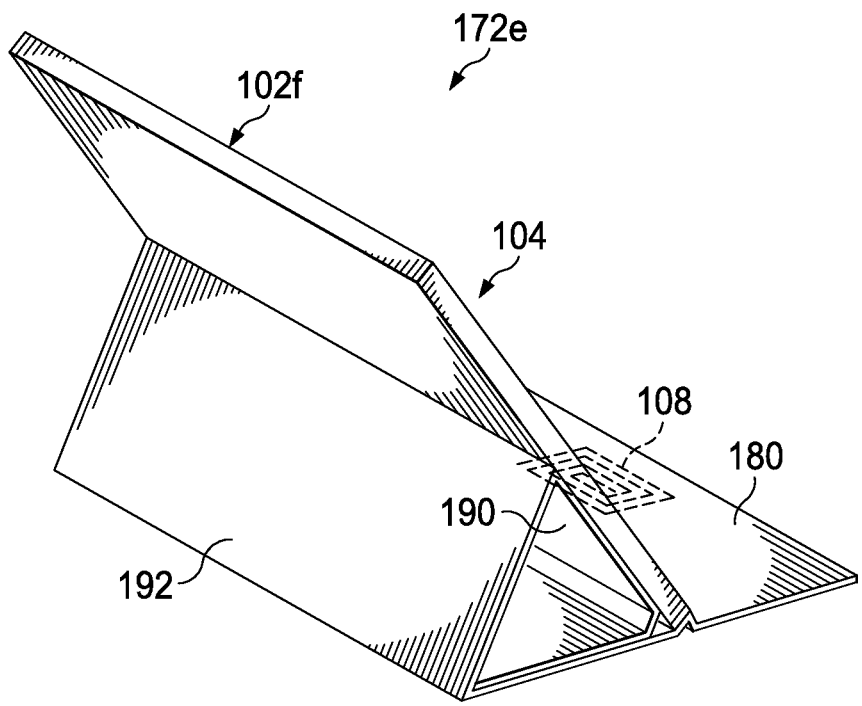
FIG. 10E is a simplified schematic diagram illustrating an plan view of an embodiment of an electronic device with a wireless charging sleeve or stand, in accordance with one embodiment of the present disclosure.

Turning to FIG. 10E, FIG. 10E is a simplified orthographic view illustrating an embodiment of electronic device 102f coupled to sleeve 172e, in accordance with one embodiment of the present disclosure. As illustrated in FIG. 10E, first support section 190 and second support section 192 have been rotated or folded into a configuration that can support electronic device 102f at a desired view angle of display 104. Sleeve 172e can be configured to allow PRU section 180 and PRU 108 to remain positioned over a PTU (not shown) to allow wireless charging of electronic device 102f using PRU 108 and interconnect 184. As illustrated in FIGS. 10B-10E, sleeve 172e can be configured to allow first support section 190 and second support section 192 to be rotated or folded into various different configurations while still allowing PRU section 180 and PRU 108 to remain positioned over a PTU (not shown) to allow wireless charging of electronic device 102f.

Figure 11A:
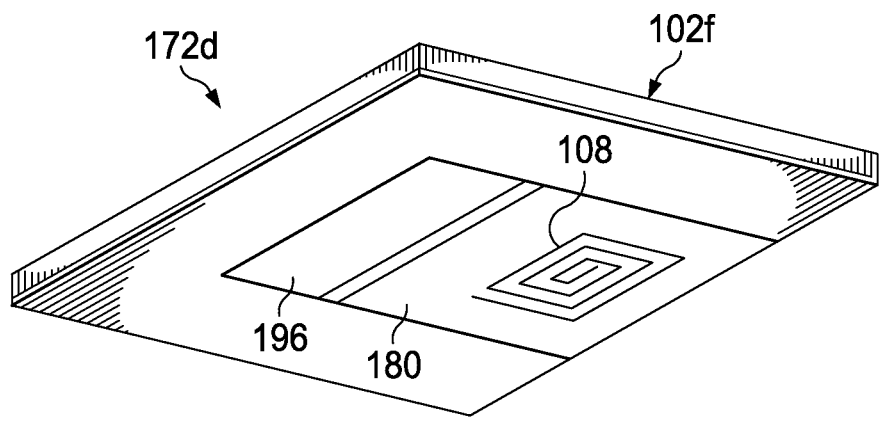
FIG. 11A is a simplified schematic diagram illustrating an plan view of an embodiment of an electronic device with a wireless charging sleeve or stand, in accordance with one embodiment of the present disclosure.
Figure 11B:
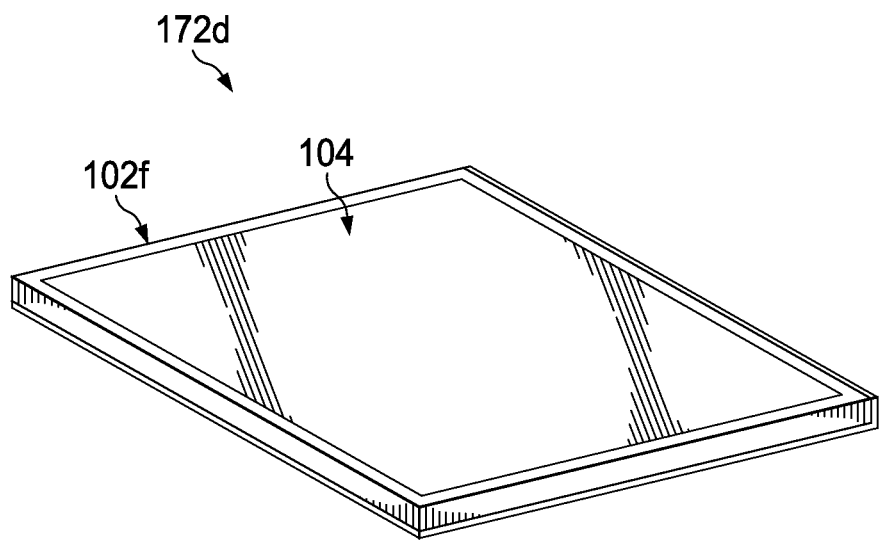
FIG. 11B is a simplified schematic diagram illustrating an plan view of an embodiment of an electronic device with a wireless charging sleeve or stand, in accordance with one embodiment of the present disclosure.

Turning to FIGS. 11A and 11B, FIGS. 11A and 11B is a simplified a plan view illustrating an embodiment of electronic device 102f coupled to a sleeve 172d, in accordance with one embodiment of the present disclosure. Sleeve 172d can include PRU section 180 and guided support section 196. PRU section 180 can include PRU 108. Sleeve 172d can be configured to allow PRU 108 to be positioned over a PTU (not shown) to allow wireless charging of electronic device 102f. PRU 108 on sleeve 172d can receive power from a PTU (not shown) and transfer the power and charge electronic device 102f.

Figure 11C:
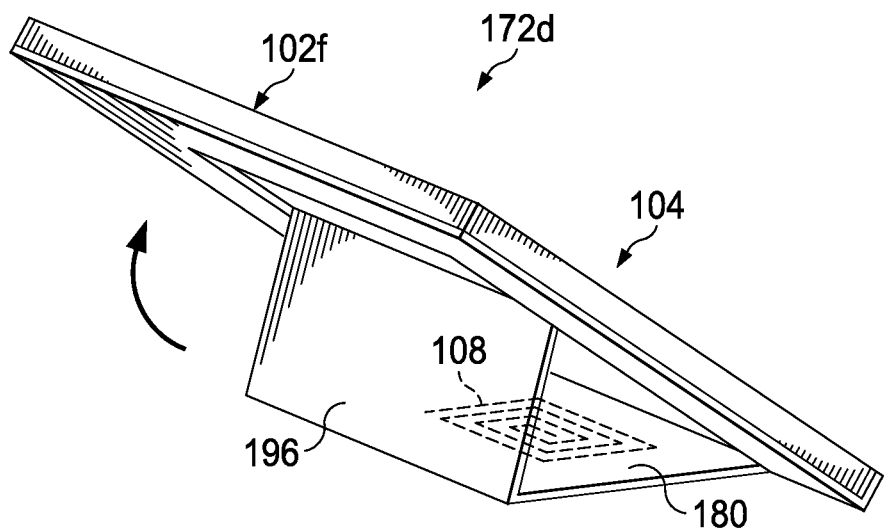
FIG. 11C is a simplified schematic diagram illustrating an plan view of an embodiment of an electronic device with a wireless charging sleeve or stand, in accordance with one embodiment of the present disclosure.

Turning to FIG. 11C, FIG. 11C is a simplified orthographic view illustrating an embodiment of electronic device 102f coupled to sleeve 172d, in accordance with one embodiment of the present disclosure. As illustrated in FIG. 11C, guided support section 196 has been slid or rotated down to provide support similar to a kickstand for electronic device 102f. Sleeve 172d can be configured to allow PRU section 180 and PRU 108 to be positioned over a PTU (not shown) to allow wireless charging of electronic device 102f.

Figure 11D:
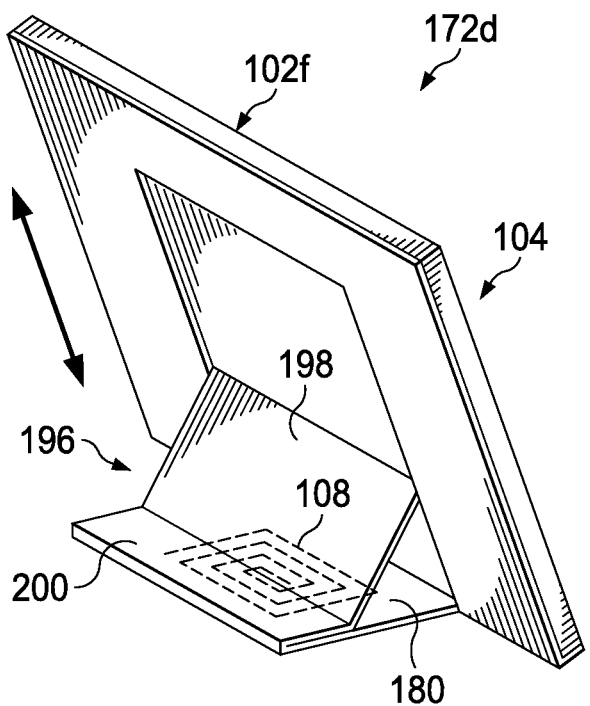
FIG. 11D is a simplified schematic diagram illustrating an plan view of an embodiment of an electronic device with a wireless charging sleeve or stand, in accordance with one embodiment of the present disclosure.

Turning to FIG. 11D, FIG. 11D is a simplified orthographic view illustrating an embodiment of electronic device 102f coupled to sleeve 172d, in accordance with one embodiment of the present disclosure. Guided support section 196 can include a first guided support section 198 and a second guided support section 200. As illustrated in FIG. 11D, second guided support section 200 has been moved to a position where it is parallel to PRU section 180. This allows for first guided support section 198 to support electronic device 102f at a steeper angle that what is illustrated in FIG. 11C. Sleeve 172d can be configured to allow PRU section 180 and PRU 108 to be positioned over a PTU (not shown) to allow wireless charging of electronic device 102f.

Figure 12A:
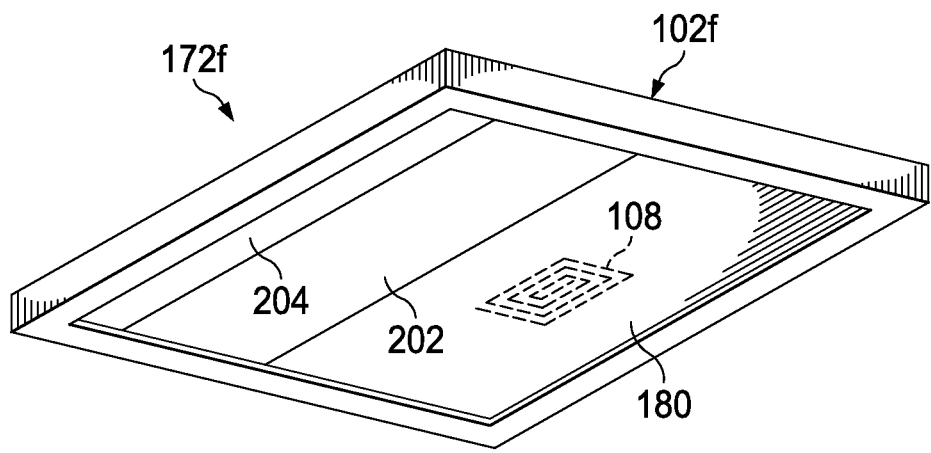
FIG. 12A is a simplified schematic diagram illustrating an plan view of an embodiment of an electronic device with a wireless charging sleeve or stand, in accordance with one embodiment of the present disclosure.
Figure 12B:
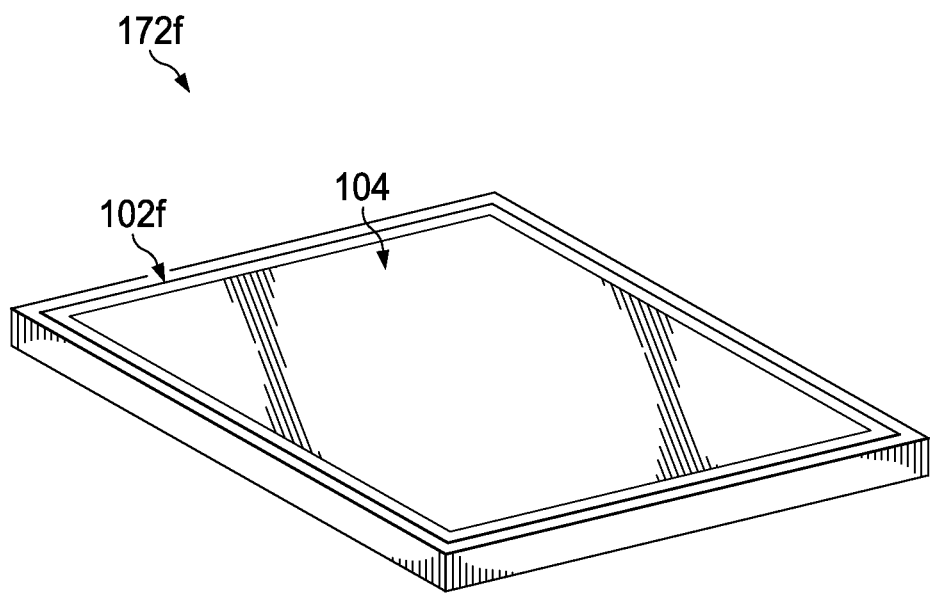
FIG. 12B is a simplified schematic diagram illustrating an plan view of an embodiment of an electronic device with a wireless charging sleeve or stand, in accordance with one embodiment of the present disclosure.

Turning to FIGS. 12A and 12B, FIGS. 12A and 12B is a simplified a plan view illustrating an embodiment of electronic device 102f coupled to a sleeve 172f, in accordance with one embodiment of the present disclosure. Sleeve 172f can include PRU section 180, first rail guided support section 202, and second rail guided support section 204. PRU section 180 can include PRU 108. Sleeve 172f can be configured to allow PRU 108 to be positioned over a PTU (not shown) to allow wireless charging of electronic device 102f. PRU 108 on sleeve 172f can receive power from a PTU (not shown) and transfer the power and charge electronic device 102f.

Figure 12C:
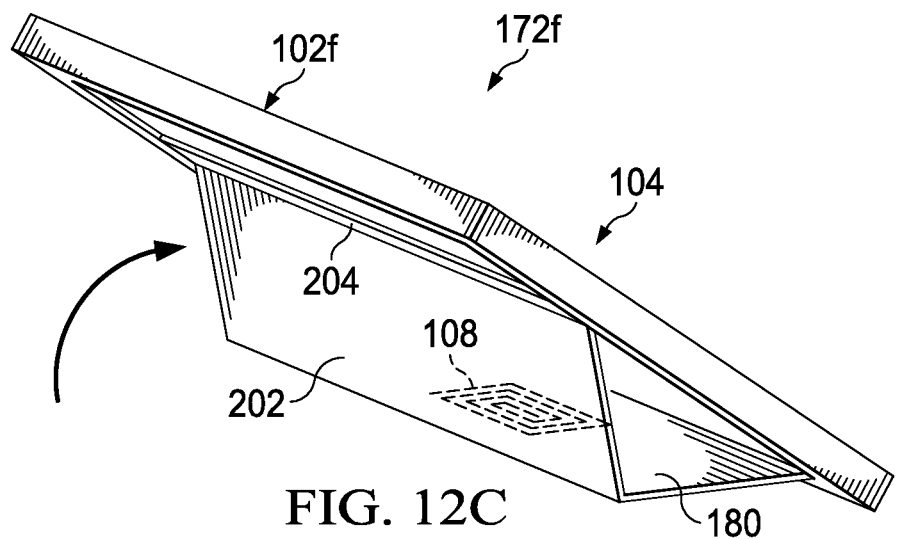
FIG. 12C is a simplified schematic diagram illustrating an plan view of an embodiment of an electronic device with a wireless charging sleeve or stand, in accordance with one embodiment of the present disclosure.

Turning to FIG. 12C, FIG. 12C is a simplified orthographic view illustrating an embodiment of electronic device 102f coupled to sleeve 172f, in accordance with one embodiment of the present disclosure. As illustrated in FIG. 12C, first rail guided support section 202 has been slid or rotated down to provide support similar to a kickstand for electronic device 102f. Second rail guided support section 204 can provide support (e.g., friction support, tabbed or locking mechanism support, magnet support, or other support means) to hold first rail guided support section 202 in place. Sleeve 172f can be configured to allow PRU section 180 and PRU 108 to be positioned over a PTU (not shown) to allow wireless charging of electronic device 102f.

Figure 12D:
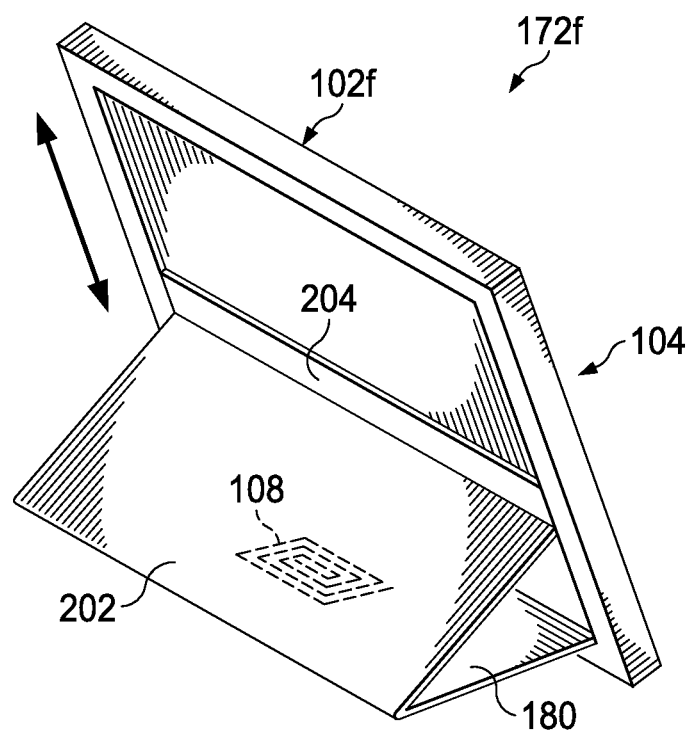
FIG. 12D is a simplified schematic diagram illustrating an plan view of an embodiment of an electronic device with a wireless charging sleeve or stand, in accordance with one embodiment of the present disclosure.

Turning to FIG. 12D, FIG. 12D is a simplified orthographic view illustrating an embodiment of electronic device 102f coupled to sleeve 172f, in accordance with one embodiment of the present disclosure. As illustrated in FIG. 11D, first rail guided support section 202 has been slid or rotated down to a position to support electronic device 102f at a steeper angle that what is illustrated in FIG. 12C. Sleeve 172f can be configured to allow PRU section 180 and PRU 108 to be positioned over a PTU (not shown) to allow wireless charging of electronic device 102f.

Figure 13A:
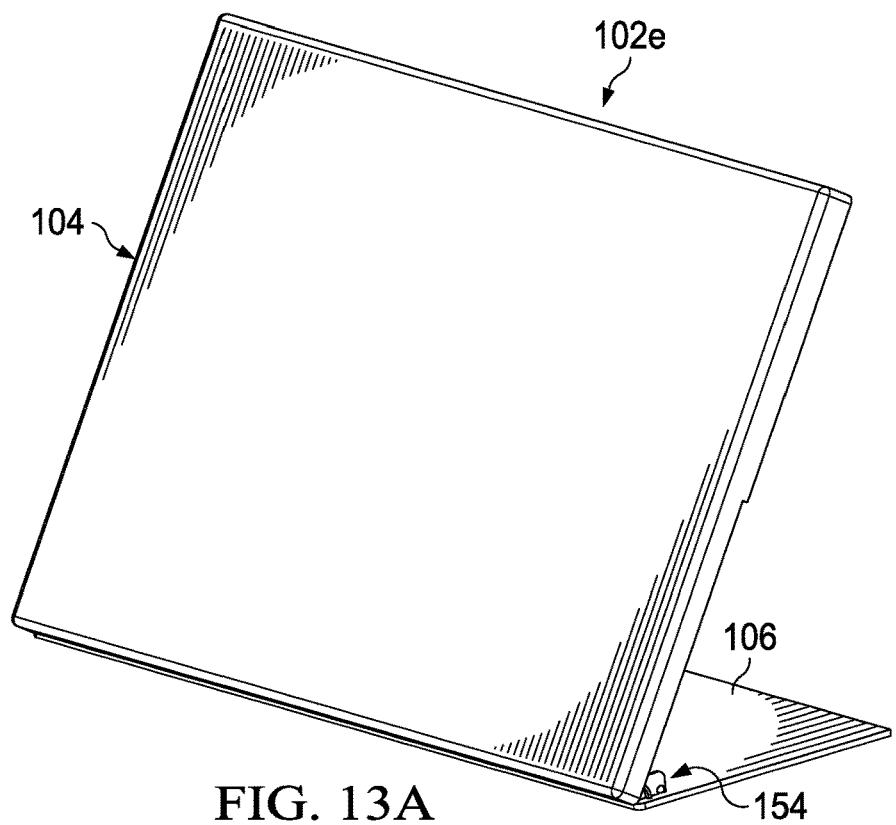
FIG. 13A is a simplified schematic diagram illustrating an orthographic view of an electronic device, in accordance with one example implementation.
Figure 13B:
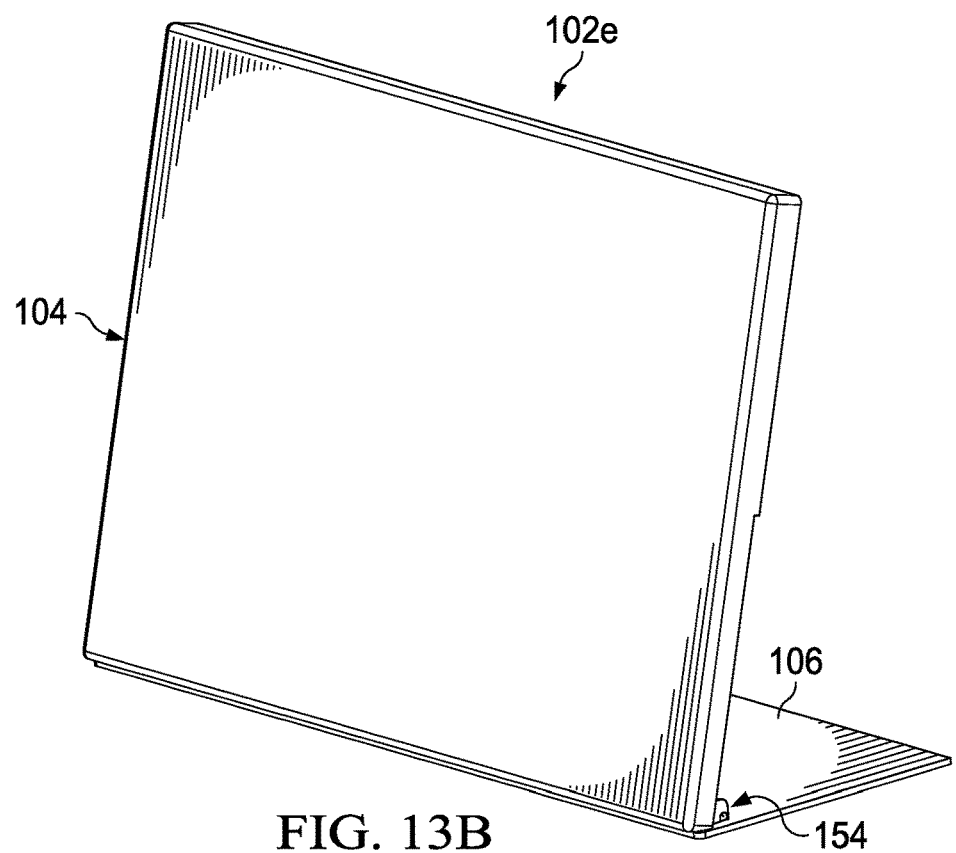
FIG. 13B is a simplified schematic diagram illustrating an orthographic view of an electronic device, in accordance with one example implementation.
Figure 13C:
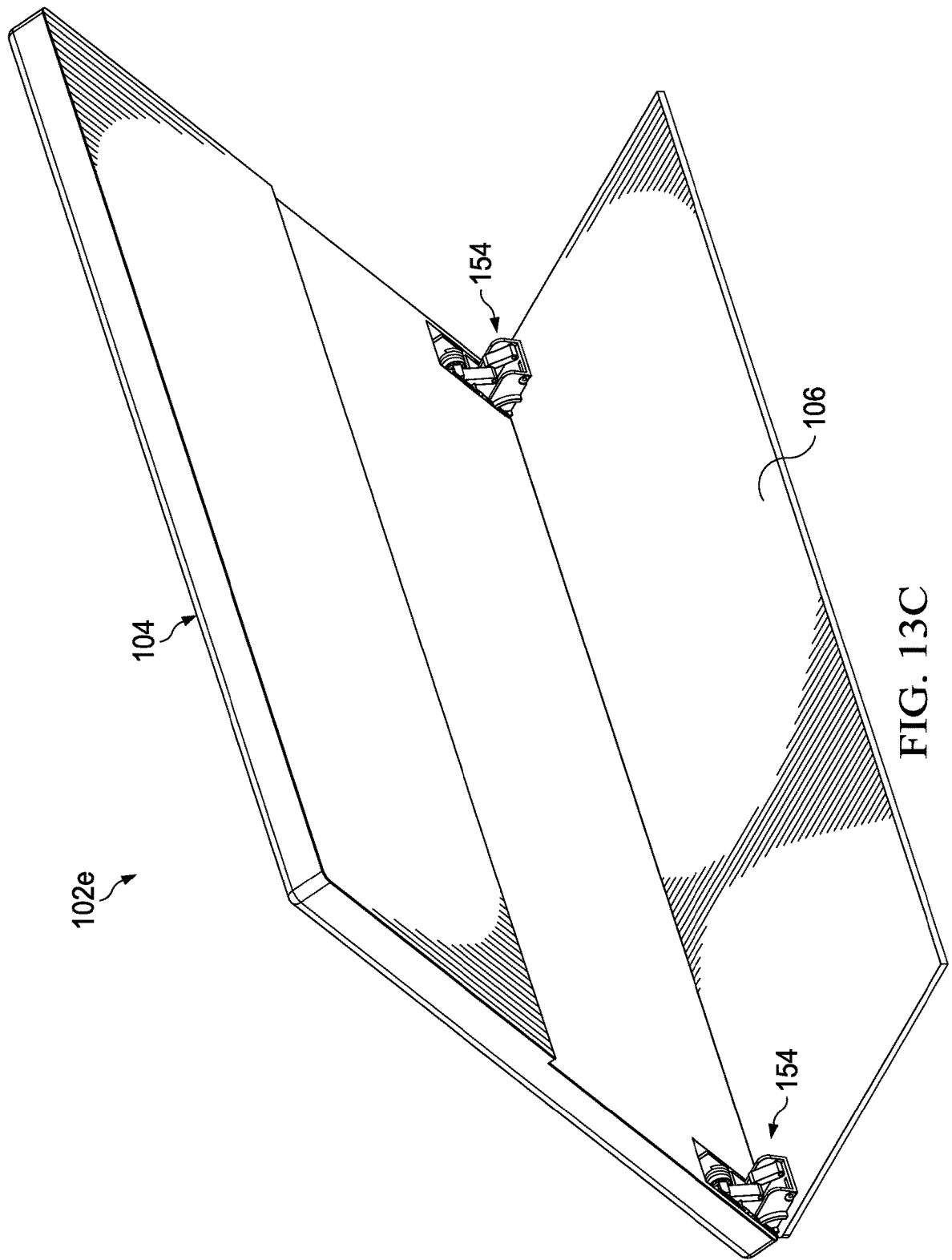
FIG. 13C is a simplified schematic diagram illustrating an orthographic view of an electronic device, in accordance with one example implementation.

Turning to FIGS. 13A-13C, FIGS. 13A-13C are a simplified orthographic view illustrating an embodiment of a portion of an electronic device 102e, in accordance with one embodiment of the present disclosure. Electronic device 102e can include display 104, wireless charging stand 106, and torque hinge 154. Torque hinge 154 can define an axis of rotation that is shared between display 104 and wireless charging stand 106. Torque hinge 154 can be configured to support electronic device 102e at multiple viewing angles. For example, FIG. 13A illustrates one viewing angle while FIG. 13B illustrates another viewing angle.

In an embodiment, torque hinge 154 can include a cam that rotates around a virtual center that allows wireless charging stand 106 to lift away before it rotates and therefore eliminating or reducing inside diameter artefacts. Also torque hinge 154 can include a linkage that couples the rotation to a torque engine that can be designed to provide assist in opening and holding torque to improve on a user experience. Torque hinge 154 can include other usages other than a hinge for a wireless charging stand 106 such as tablet media consumption, stylus drawing, promoting a highly productive 2-in-1 compared to current ones, etc.

Figure 14A:
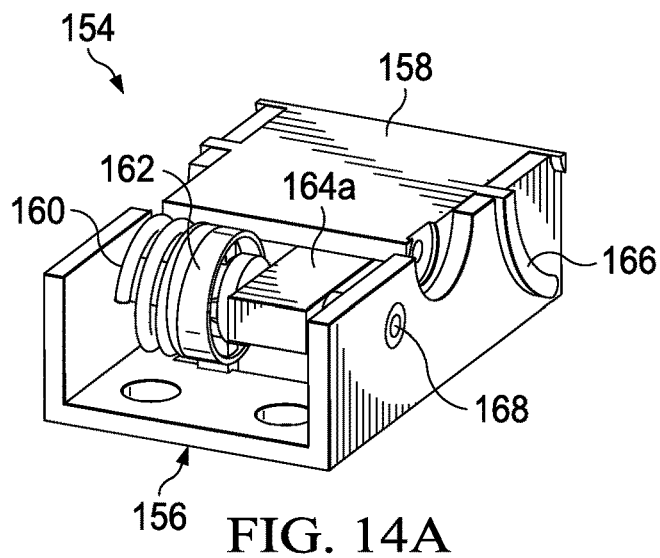
FIG. 14A is a simplified schematic diagram illustrating an orthographic view of an embodiment of a portion of an electronic device, in accordance with one embodiment of the present disclosure.

Turning to FIG. 14A, FIG. 14A is a simplified orthographic view illustrating an embodiment of torque hinge 154, in accordance with one embodiment of the present disclosure. As illustrated in FIG. 14A, torque hinge 154 is in a closed configuration. Torque hinge 154 can include an electronic device mounting area 156, a wireless charging stand mounting area 158, spring 160, cam 162, linkage 164a and 164b, and virtual center cam 166. Spring 160, cam 162 and linkage 164a may be coupled together on axis 168.

Figure 14B:
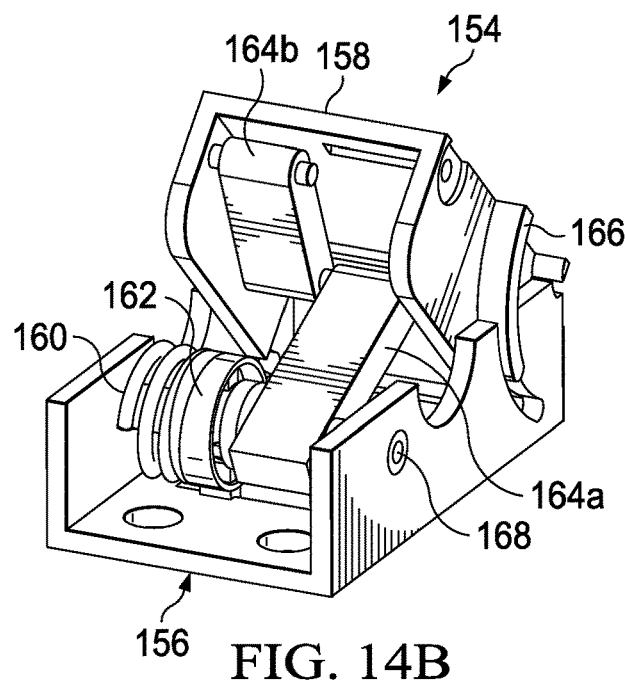
FIG. 14B is a simplified schematic diagram illustrating an orthographic view of an embodiment of a portion of an electronic device, in accordance with one embodiment of the present disclosure.

Turning to FIG. 14B, FIG. 14B is a simplified orthographic view illustrating an embodiment of torque hinge 154, in accordance with one embodiment of the present disclosure. As illustrated in FIG. 14B, torque hinge 154 is in a partially open configuration. Spring 160 can provide spring torque to assist torque hinge 154 rotating into the partially open configuration. Once in the partially open configuration, the configuration of linkage 164a and 164b can provide a friction stop that will allow for adjustment of the angle of torque hinge 154 in a fully open configuration.

Figure 14C:
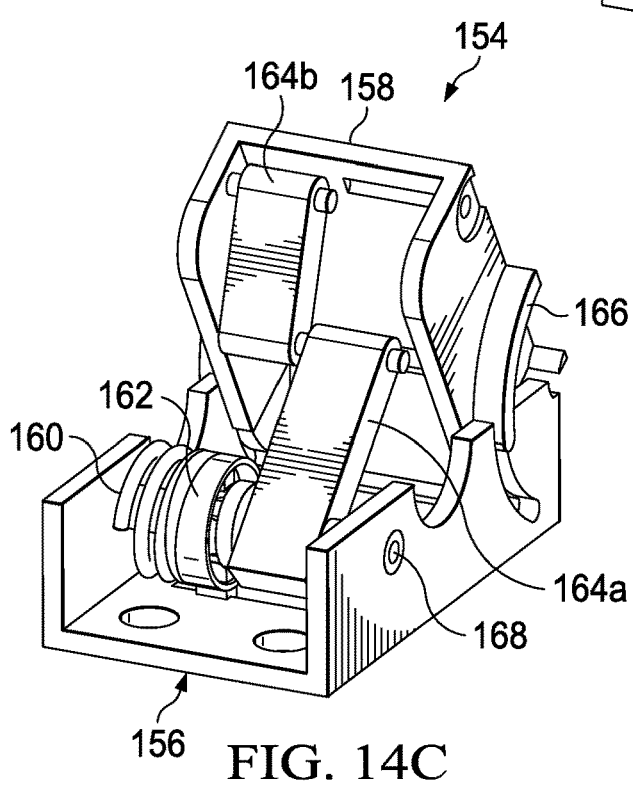
FIG. 14C is a simplified schematic diagram illustrating an orthographic view of an embodiment of a portion of an electronic device, in accordance with one embodiment of the present disclosure.

Turning to FIG. 14C, FIG. 14C is a simplified orthographic view illustrating an embodiment of torque hinge 154, in accordance with one embodiment of the present disclosure. As illustrated in FIG. 14B, torque hinge 154 is in a fully open configuration. In the fully open configuration, linkage can hold the open angle to a desired angle.

Figure 15:
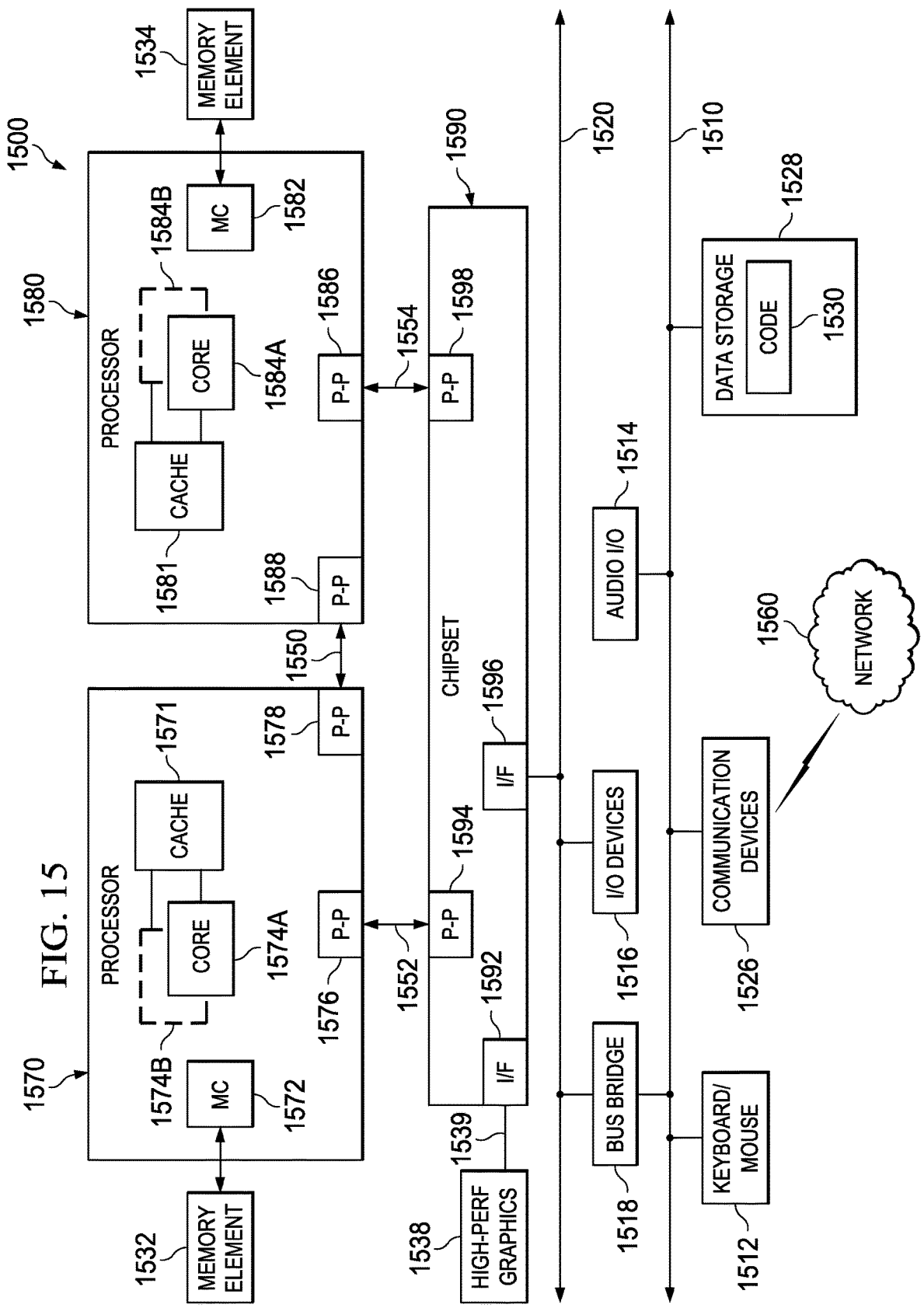
FIG. 15 is a block diagram illustrating an example computing system that is arranged in a point-to-point configuration in accordance with an embodiment.

Turning to FIG. 15, FIG. 15 illustrates a computing system 1500 that is arranged in a point-to-point (PtP) configuration according to an embodiment. In particular, FIG. 15 shows a system where processors, memory, and input/output devices are interconnected by a number of point-to-point interfaces. Generally, one or more of the network elements of communication system 10 may be configured in the same or similar manner as computing system 1500.

As illustrated in FIG. 15, system 1500 may include several processors, of which only two, processors 1570 and 1580, are shown for clarity. While two processors 1570 and 1580 are shown, it is to be understood that an embodiment of system 1500 may also include only one such processor. Processors 1570 and 1580 may each include a set of cores (i.e., processor cores 1574A and 1574B and processor cores 1584A and 1584B) to execute multiple threads of a program. The cores may be configured to execute instruction code in a manner similar to that discussed above with reference to FIGS. 1-7. Each processor 1570, 1580 may include at least one shared cache 1571, 1581. Shared caches 1571, 1581 may store data (e.g., instructions) that are utilized by one or more components of processors 1570, 1580, such as processor cores 1574 and 1584.

Processors 1570 and 1580 may also each include integrated memory controller logic (MC) 1572 and 1582 to communicate with memory elements 1532 and 1534. Memory elements 1532 and/or 1534 may store various data used by processors 1570 and 1580. In alternative embodiments, memory controller logic 1572 and 1582 may be discrete logic separate from processors 1570 and 1580.

Processors 1570 and 1580 may be any type of processor and may exchange data via a point-to-point (PtP) interface 1550 using point-to-point interface circuits 1578 and 1588, respectively. Processors 1570 and 1580 may each exchange data with a chipset 1590 via individual point-to-point interfaces 1552 and 1554 using point-to-point interface circuits 1576, 1586, 1594, and 1598. Chipset 1590 may also exchange data with a high-performance graphics circuit 1538 via a high-performance graphics interface 1539, using an interface circuit 1592, which could be a PtP interface circuit. In alternative embodiments, any or all of the PtP links illustrated in FIG. 15 could be implemented as a multi-drop bus rather than a PtP link.

Chipset 1590 may be in communication with a bus 1520 via an interface circuit 1596. Bus 1520 may have one or more devices that communicate over it, such as a bus bridge 1518 and I/O devices 1516. Via a bus 1510, bus bridge 1518 may be in communication with other devices such as a keyboard/mouse 1512 (or other input devices such as a touch screen, trackball, etc.), communication devices 1526 (such as modems, network interface devices, or other types of communication devices that may communicate through a computer network 1560), audio I/O devices 1514, and/or a data storage device 1528. Data storage device 1528 may store code 1530, which may be executed by processors 1570 and/or 1580. In alternative embodiments, any portions of the bus architectures could be implemented with one or more PtP links.

The computer system depicted in FIG. 15 is a schematic illustration of an embodiment of a computing system that may be utilized to implement various embodiments discussed herein. It will be appreciated that various components of the system depicted in FIG. 15 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 16:
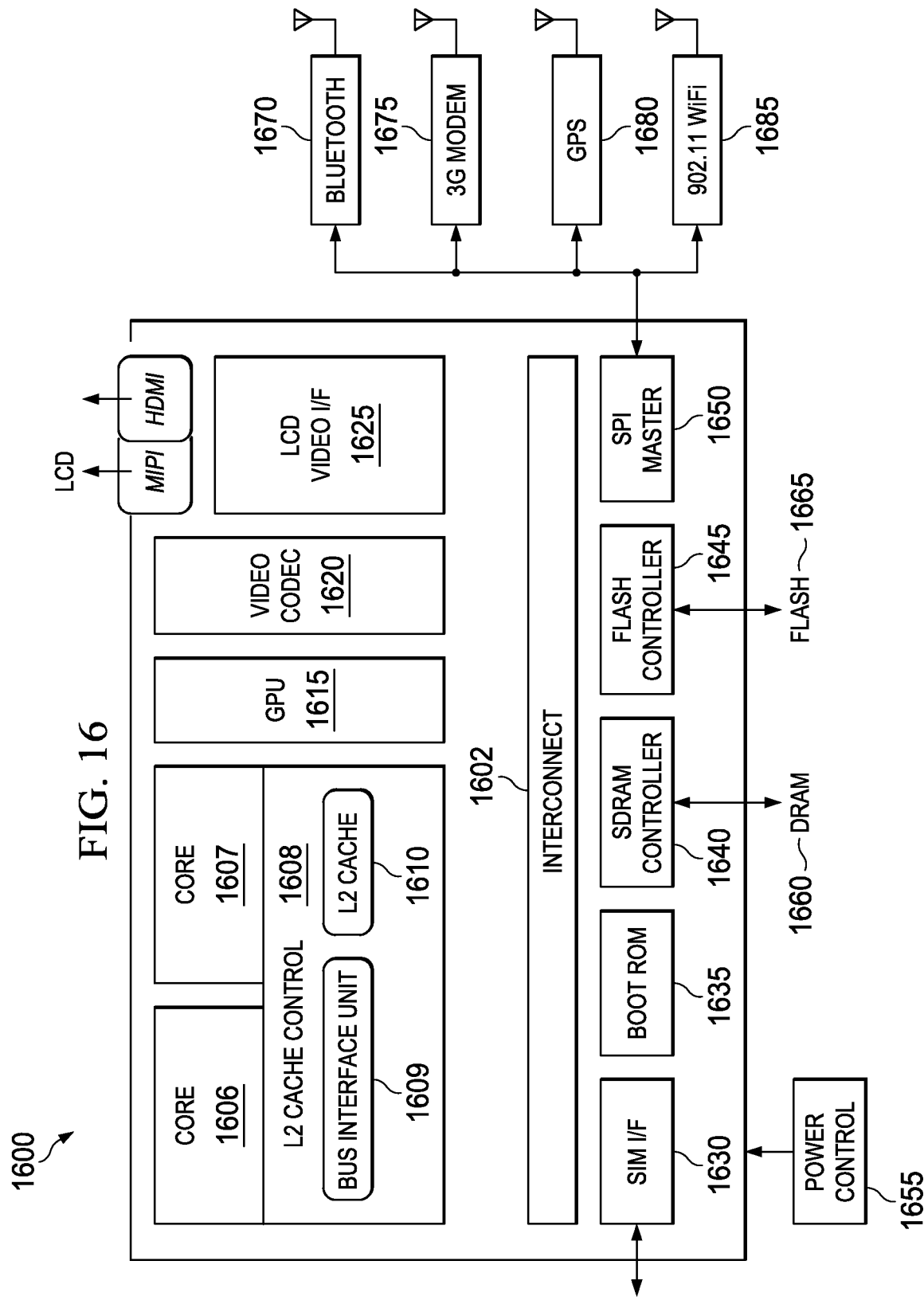
FIG. 16 is a simplified block diagram associated with an example ARM ecosystem system on chip (SOC) of the present disclosure.

Turning to FIG. 16, FIG. 16 is a simplified block diagram associated with an example ARM ecosystem SOC 1600 of the present disclosure. At least one example implementation of the present disclosure can include the combination of multiple reputations features discussed herein and an ARM component. For example, the example of FIG. 16 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 16, ARM ecosystem SOC 1600 may include multiple cores 1606-1607, an L2 cache control 1608, a bus interface unit 1609, an L2 cache 1610, a graphics processing unit (GPU) 1615, an interconnect 1602, a video codec 1620, and a liquid crystal display (LCD) I/F 1625, which may be associated with mobile industry processor interface (MIPI)/high-definition multimedia interface (HDMI) links that couple to an LCD.

ARM ecosystem SOC 1600 may also include a subscriber identity module (SIM) I/F 1630, a boot read-only memory (ROM) 1635, a synchronous dynamic random access memory (SDRAM) controller 1640, a flash controller 1645, a serial peripheral interface (SPI) master 1650, a suitable power control 1655, a dynamic RAM (DRAM) 1660, and flash 1665. In addition, one or more example embodiments include one or more communication capabilities, interfaces, and features such as instances of Bluetooth™ 1670, a 3G modem 1675, a global positioning system (GPS) 1680, and an 802.11 Wi-Fi 1685.

In operation, the example of FIG. 16 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 17:
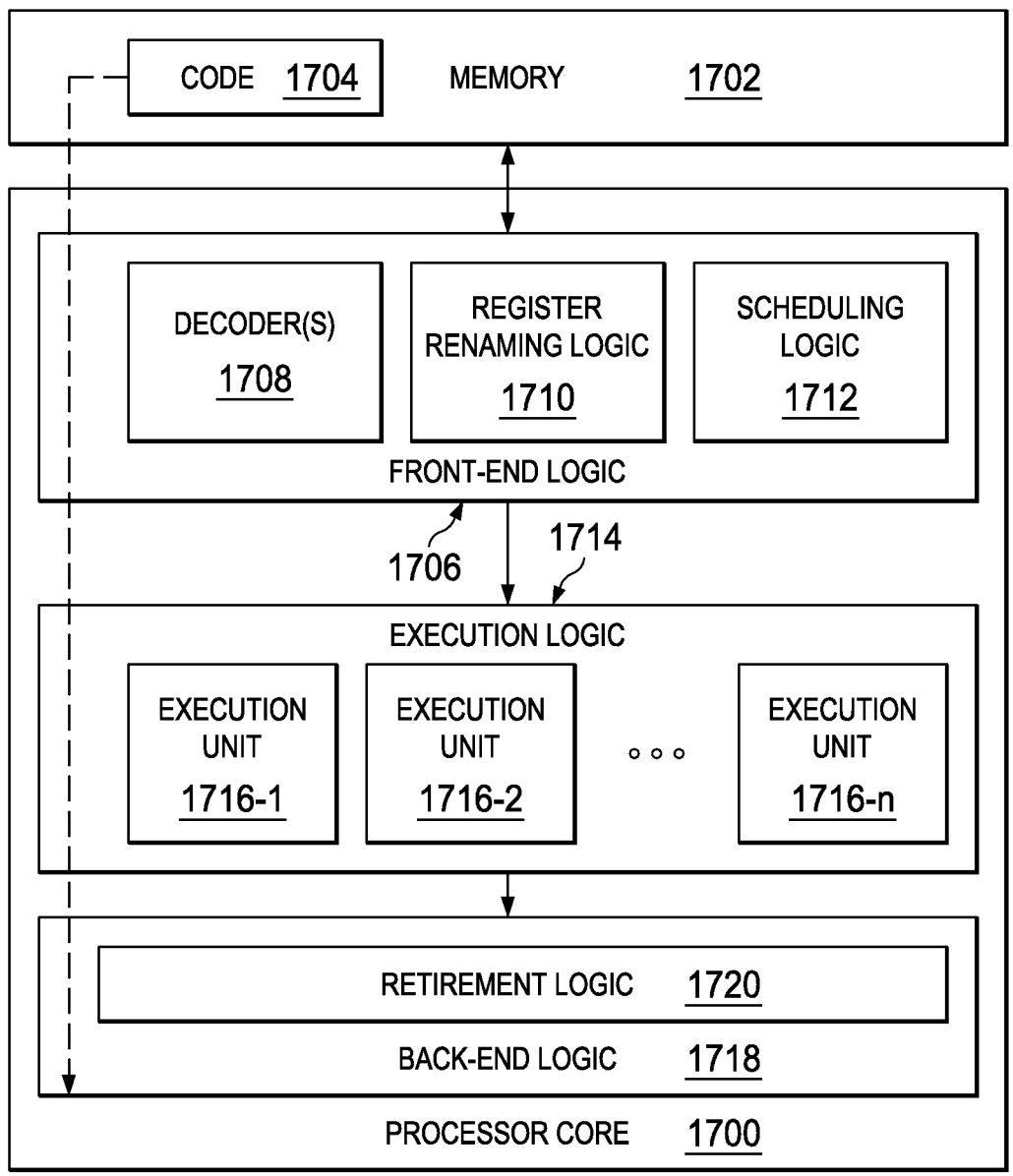
FIG. 17 is a block diagram illustrating an example processor core in accordance with an embodiment.

FIG. 17 illustrates a processor core 1700 according to an embodiment. Processor core 1700 may be the core for any type of processor, such as a micro-processor, an embedded processor, a digital signal processor (DSP), a network processor, or other device to execute code. Although only one processor core 1700 is illustrated in FIG. 17, a processor may alternatively include more than one of the processor core 1700 illustrated in FIG. 17. For example, processor core 1700 represents one example embodiment of processors cores 1574a, 1574b, 1584a, and 1584b shown and described with reference to processors 1570 and 1580 of FIG. 15. Processor core 1700 may be a single-threaded core or, for at least one embodiment, processor core 1700 may be multi-threaded in that it may include more than one hardware thread context (or "logical processor") per core.

FIG. 17 also illustrates a memory 1702 coupled to processor core 1700 in accordance with an embodiment. Memory 1702 may be any of a wide variety of memories (including various layers of memory hierarchy) as are known or otherwise available to those of skill in the art. Memory 1702 may include code 1704, which may be one or more instructions, to be executed by processor core 1700. Processor core 1700 can follow a program sequence of instructions indicated by code 1704. Each instruction enters a front-end logic 1706 and is processed by one or more decoders 1708. The decoder may generate, as its output, a micro operation such as a fixed width micro operation in a predefined format, or may generate other instructions, microinstructions, or control signals that reflect the original code instruction. Front-end logic 1706 also includes register renaming logic 1710 and scheduling logic 1712, which generally allocate resources and queue the operation corresponding to the instruction for execution.

Processor core 1700 can also include execution logic 1714 having a set of execution units 1716-1 through 1716-N. Some embodiments may include a number of execution units dedicated to specific functions or sets of functions. Other embodiments may include only one execution unit or one execution unit that can perform a particular function. Execution logic 1714 performs the operations specified by code instructions.

After completion of execution of the operations specified by the code instructions, back-end logic 1718 can retire the instructions of code 1704. In one embodiment, processor core 1700 allows out of order execution but requires in order retirement of instructions. Retirement logic 1720 may take a variety of known forms (e.g., re-order buffers or the like). In this manner, processor core 1700 is transformed during execution of code 1704, at least in terms of the output generated by the decoder, hardware registers and tables utilized by register renaming logic 1710, and any registers (not shown) modified by execution logic 1714.

Although not illustrated in FIG. 17, a processor may include other elements on a chip with processor core 1700, at least some of which were shown and described herein with reference to FIG. 8. For example, as shown in FIG. 8, a processor may include memory control logic along with processor core 1700. The processor may include I/O control logic and/or may include I/O control logic integrated with memory control logic. Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the present disclosure has been illustrated with reference to particular elements and operations that facilitate the communication process, these elements and operations may be replaced by any suitable architecture, protocols, and/or processes that achieve the intended functionality of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example A1 is an electronic device that includes a first housing, where the first housing includes a display and a wireless charging stand. The wireless charging stand includes a power receiving unit and is configured to wireless charge the electronic device and can support the first housing at different viewing angles of the display.

In Example A2, the subject matter of Example A1 may optionally include where the wireless charging stand includes a kickstand.

In Example A3, the subject matter of any of the preceding 'A' Examples can optionally include where the wireless charging stand includes a power transmitting unit to wireless charge a second electronic device.

In Example A4, the subject matter of any of the preceding 'A' Examples can optionally include where the wireless charging stand includes a ferromagnetic material to at least partially isolate the power receiving unit from the electronic device.

In Example A5, the subject matter of any of the preceding 'A' Examples can optionally include where the wireless charging stand includes a resonance circuit.

In Example A6, the subject matter of any of the preceding 'A' Examples can optionally include where the wireless charging stand includes a plurality of power transmitting units to wireless charge a plurality of second electronic devices.

In Example A7, the subject matter of any of the preceding 'A' Examples can optionally include where the wireless charging stand includes a surface support portion that includes the power receiving unit, a transition portion that can be rotated onto the surface support portion, and a kickstand portion that can be configured to support the first housing at a desired viewing angle.

Example AA1 is a wireless charging stand that includes an electronic device cradle configured to support an electronic device at different viewing angles and a base. The base includes a power receiving unit and is configured to wireless charge the electronic device when the electronic device is in the electronic device cradle.

In Example AA2, the subject matter of Example AA1 may optionally include where the wireless charging stand includes a power transmitting unit.

In Example AA3, the subject matter of any of the preceding 'AA' Examples can optionally include where the wireless charging stand includes a ferromagnetic material to at least partially isolate the power receiving unit from the electronic device.

In Example AA4, the subject matter of any of the preceding 'AA' Examples can optionally include where the wireless charging stand includes a resonance circuit.

In Example AA5, the subject matter of any of the preceding 'AA' Examples can optionally include where the electronic device cradle can be rotated from a relatively flat configuration to an almost ninety degree configuration.

Example M1 is a method that includes positioning an electronic device that includes a includes a power receiving unit on a power transmitting unit to wirelessly charge the electronic device and adjusting a viewing angle of the electronic device without removing the power receiving unit from the power transmitting unit to allow the wireless charging to continue.

In Example M2, the subject matter of any of the preceding 'M' Examples can optionally include where the electronic device includes a display and a wireless charging stand and the display can be rotated relative to the wireless charging stand.

In Example M3, the subject matter of any of the preceding 'M' Examples can optionally include where the wireless charging stand includes a power transmitting unit to wireless charge a second electronic device.

In Example M4, the subject matter of any of the preceding 'M' Examples can optionally include where the wireless charging stand includes a ferromagnetic material to at least partially isolate the power receiving unit from the electronic device.

An example system S1 can include an electronic device that includes a display and a wireless charging stand that includes a power receiving unit and is configured to wireless charge the electronic device and can support the display at a desired viewing angle.

An example system S2 can include where the wireless charging stand includes a power transmitting unit to wireless charge a second electronic device.

In Example S3, the subject matter of any of the preceding 'SS' Examples can optionally include where the wireless charging stand includes a ferromagnetic material to at least partially isolate the power receiving unit from the electronic device.

In Example S4, the subject matter of any of the preceding 'SS' Examples can optionally include where the wireless charging stand includes a resonance circuit.

The invention claimed is:

1. An electronic device, comprising:
a base, wherein the base includes a base wireless power receiving unit and one or more base wireless power transmitting units;
an electronic device cradle, wherein the electronic device cradle includes a wireless power transmitting unit, wherein the wireless power transmitting unit is configured to wirelessly charge a second electronic device; and
a hinge, wherein the hinge rotatable couples the electronic device cradle to the base and when the electronic device cradle is rotated away from the base, the wireless power transmitting unit is also rotated away from the base wireless power receiving unit and the base wireless power receiving unit provides power to the wireless power transmitting unit to wirelessly charge the second electronic device.

2. The electronic device of claim 1, further comprising: a kickstand.

3. The electronic device of claim 1, wherein each of the one or more base wireless power transmitting units can wirelessly charge a third electronic device.

4. The electronic device of claim 3, wherein the electronic device cradle includes ferromagnetic material to at least partially isolate the base wireless power receiving unit from the second electronic device.

5. The electronic device of claim 1, wherein each of the one or more base wireless power transmitting units can wirelessly charge a third electronic device while the base wireless power receiving unit provides power to the wireless power transmitting unit to wirelessly charge the second electronic device.

6. The electronic device of claim 1, further comprising:
a resonance circuit, wherein the resonance circuit allows the base wireless power receiving unit to provide the power to the wireless power transmitting unit to wirelessly charge the second electronic device.

7. A wireless charging stand comprising:
an electronic device cradle, wherein the electronic device cradle includes a wireless power transmitting unit, wherein the wireless power transmitting unit is configured to wirelessly charge an electronic device when the electronic device is in the electronic device cradle;
a base, wherein the base includes a base wireless power receiving unit and one or more base wireless power transmitting units; and
a hinge, wherein the hinge rotatable couples the electronic device cradle to the base and when the electronic device cradle is rotated away from the base, the wireless power transmitting unit is also rotated away from the base wireless power receiving unit and the base wireless power receiving unit provides power to the wireless power transmitting unit to wirelessly charge the electronic device.

8. The wireless charging stand of claim 7, wherein each of the one or more base wireless power transmitting units can wirelessly charge a third electronic device while the base wireless power receiving unit provides power to the wireless power transmitting unit to wirelessly charge the electronic device.

9. The wireless charging stand of claim 7, further comprising:
ferromagnetic material to at least partially isolate the base wireless power receiving unit from the electronic device.

10. The wireless charging stand of claim 7, further comprising:
a resonance circuit.

11. The wireless charging stand of claim 7, wherein the electronic device cradle can be rotated from a relatively flat configuration to an almost ninety degree configuration.

12. A method, comprising:
positioning an electronic device that includes a wireless power receiving unit on a wireless charging stand to wirelessly charge the electronic device, wherein the wireless charging stand includes:
a base, wherein the base includes a base wireless power receiving unit and one or more base wireless power transmitting units;
an electronic device cradle, wherein the electronic device cradle includes a wireless power transmitting unit, wherein the wireless power transmitting unit is configured to wirelessly charge the electronic device; and
a hinge, wherein the hinge rotatable couples the electronic device cradle to the base and when the electronic device cradle is rotated away from the base, the wireless power transmitting unit is also rotated away from the base wireless power receiving unit; and
adjusting a viewing angle of the electronic device by rotating the electronic device cradle away from the base without removing the wireless power receiving unit from the wireless power transmitting unit to allow the wireless charging of the electronic device to continue, wherein the base wireless power receiving unit provides power to the wireless power transmitting unit to wirelessly charge the electronic device.

13. The method of claim 12, wherein the wireless charging stand includes ferromagnetic material to at least partially isolate the base wireless power receiving unit from the electronic device.

14. A system, comprising:
- an electronic device, wherein the electronic device includes a display; and
- a wireless charging stand, wherein the wireless charging stand includes:
  - a base, wherein the base includes a base wireless power receiving unit and one or more base wireless power transmitting units;
  - an electronic device cradle, wherein the electronic device cradle includes a wireless power transmitting unit, wherein the wireless power transmitting unit is configured to wirelessly charge the electronic device; and
  - a hinge, wherein the hinge rotatable couples the electronic device cradle to the base and when the electronic device cradle is rotated away from the base, the wireless power transmitting unit is also rotated away from the base wireless power receiving unit and the base wireless power receiving unit provides power to the wireless power transmitting unit to wirelessly charge the electronic device.

15. The system of claim 14, wherein each of the one or more base wireless power transmitting units can wirelessly charge a second electronic device.

16. The system of claim 14, wherein the wireless charging stand includes ferromagnetic material to at least partially isolate the base wireless power receiving unit from the electronic device.

17. The system of claim 14, wherein the wireless charging stand includes a resonance circuit.

18. The electronic device of claim 1, further comprising:
- a charging path, wherein the charging path allows the base wireless power receiving unit to provide the power to the wireless power transmitting unit to wirelessly charge the electronic device.

19. The wireless charging stand of claim 7, further comprising:
- a charging path, wherein the charging path allows the base wireless power receiving unit to provide the power to the wireless power transmitting unit to wirelessly charge the electronic device.

20. The system of claim 14, wherein the wireless charging stand includes a charging path that allows the base wireless power receiving unit to provide the power to the wireless power transmitting unit to wirelessly charge the electronic device.

* * * * *